US011962069B2

(12) United States Patent
Lee et al.

(10) Patent No.: US 11,962,069 B2
(45) Date of Patent: Apr. 16, 2024

(54) ELECTRONIC DEVICE INCLUDING GRIP SENSING PAD

(71) Applicant: Samsung Electronics Co., Ltd., Gyeonggi-do (KR)

(72) Inventors: Seokwoo Lee, Gyeonggi-do (KR); Yeonghun Gu, Gyeonggi-do (KR); Youngho Park, Gyeonggi-do (KR); Jiwoo Lee, Gyeonggi-do (KR); Kio Jung, Gyeonggi-do (KR); Ko Choi, Gyeonggi-do (KR); Woojin Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 241 days.

(21) Appl. No.: 17/679,284

(22) Filed: Feb. 24, 2022

(65) Prior Publication Data

US 2022/0285825 A1    Sep. 8, 2022

Related U.S. Application Data

(63) Continuation of application No. PCT/KR2022/002066, filed on Feb. 11, 2022.

(30) Foreign Application Priority Data

Mar. 3, 2021    (KR) .................. 10-2021-0028338

(51) Int. Cl.
*H01Q 1/24* (2006.01)
*H01Q 1/38* (2006.01)
(Continued)

(52) U.S. Cl.
CPC .............. *H01Q 1/243* (2013.01); *H01Q 1/245* (2013.01); *H01Q 1/38* (2013.01); *H04M 1/0277* (2013.01); *H04M 1/72454* (2021.01)

(58) Field of Classification Search
CPC .......... H01Q 1/243; H01Q 1/245; H01Q 1/38; H04M 1/02777; H04M 1/72454
See application file for complete search history.

(56) References Cited

U.S. PATENT DOCUMENTS 9,350,081 B2   5/2016  Heikura et al.
10,320,063 B2  6/2019  Wei et al.
(Continued)

FOREIGN PATENT DOCUMENTS

CN        105607841 A      5/2016
KR   10-2018-0025710 A     3/2018
(Continued)

OTHER PUBLICATIONS

International Search Report dated May 30, 2022.

*Primary Examiner* — Hoang V Nguyen
*Assistant Examiner* — Amal Patel
(74) *Attorney, Agent, or Firm* — Cha & Reiter, LLC

(57) ABSTRACT

An electronic device is disclosed, including: a housing including a nonconductive area, a first printed circuit board (PCB) including a cavity and a fill-cut area, overlapping the nonconductive area, a first antenna module including at least one antenna array disposed in the cavity of the first PCB, a support frame coupled to one surface of the first PCB, supporting the first antenna module, a grip sensing pad surrounding the cavity and overlapping the fill-cut area, and a sensing circuit unit electrically connected to the grip sensing pad, configured to control an output power of the first antenna module based on inputs received via the grip sensing pad.

20 Claims, 21 Drawing Sheets

(51) Int. Cl.
    *H04M 1/02*            (2006.01)
    *H04M 1/72454*    (2021.01)

(56) References Cited

U.S. PATENT DOCUMENTS

| | | |
|---|---|---|
| 10,381,881 B2 | 8/2019 | Wittenberg et al. |
| 10,491,041 B2 | 11/2019 | Wittenberg et al. |
| 10,637,129 B2 | 4/2020 | Wei et al. |
| 10,840,962 B2 | 11/2020 | Kim |
| 11,056,827 B2 | 7/2021 | Yeo et al. |
| 11,177,557 B2 | 11/2021 | Lee et al. |
| 2015/0200463 A1 | 7/2015 | Heikura et al. |
| 2018/0166772 A1 | 6/2018 | Wei et al. |
| 2019/0074729 A1 | 3/2019 | Wittenberg et al. |
| 2019/0260116 A1 | 8/2019 | Wei et al. |
| 2019/0393730 A1 | 12/2019 | Wittenberg et al. |
| 2020/0194928 A1 | 6/2020 | Yeo et al. |
| 2020/0212584 A1* | 7/2020 | Park .................. H01Q 21/08 |
| 2020/0365969 A1* | 11/2020 | Lee .................. H01Q 21/06 |
| 2021/0120113 A1* | 4/2021 | Shim .................. H04M 1/026 |

FOREIGN PATENT DOCUMENTS

| | | |
|---|---|---|
| KR | 10-2019-0027341 A | 3/2019 |
| KR | 10-2019-0060573 A | 6/2019 |
| KR | 10-2020-0073478 A | 6/2020 |
| KR | 10-2020-0122387 A | 10/2020 |

\* cited by examiner

ELECTRONIC DEVICE INCLUDING GRIP SENSING PAD

CROSS-REFERENCE TO RELATED APPLICATION(S)

This application is a continuation application, claiming priority under § 365(c), of an International application No. PCT/KR2022/002066, filed on Feb. 11, 2022, which is based on and claims the benefit of a Korean patent application number 10-2021-0028338, filed on Mar. 3, 2021, in the Korean Intellectual Property Office, the disclosure of which is incorporated by reference herein in its entirety.

TECHNICAL FIELD

Embodiments disclosed in the disclosure relate to an electronic device including a grip sensing pad.

BACKGROUND

With the continued development in mobile communication technologies, antenna-equipped electronic devices have become widespread. These electronic devices may transmit and/or receive a radio frequency (RF) signal including a voice and other media data (e.g., a message, a picture, a video, a music file, or a game) by using the equipped antenna to implement wireless communication.

As the frequencies designated for wireless communication increase, an amount of energy radiated to the human body also increases, creating potential harm to human health. Each country has defined sets of wireless standards in consideration of ensuring that radiative electromagnetic waves do not exceed certain intensities, to safeguard human health.

An electronic device may meet a national electromagnetic wave exposure limit by lowering a maximum power of a wireless signal that is to be transmitted. However, when the maximum power is lowered in this way, there may be degradation in the performance and stability of the device's communication functions.

Certain embodiments of the disclosure provide an electronic device including a grip sensing pad, in which inputs thereof may control transmission power of a wireless signal, depending on characteristics of proximity and/or contact of a human body to the electronic device.

SUMMARY

According to an aspect of the disclosure, an electronic device may include a housing including a nonconductive area, a first printed circuit board (PCB) including a cavity and a fill-cut area, overlapping the nonconductive area, a first antenna module including at least one antenna array disposed in the cavity of the first PCB, a support frame coupled to one surface of the first PCB, supporting the first antenna module, a grip sensing pad surrounding the cavity and overlapping the fill-cut area, and a sensing circuit unit electrically connected to the grip sensing pad, configured to control an output power of the first antenna module based on inputs received via the grip sensing pad.

According to the embodiments disclosed in the disclosure, the electronic device may detect with improved accuracy whether a human body is in proximate approach to the electronic device through a grip sensing pad surrounding an antenna module.

According to the embodiments disclosed in the disclosure, when a lack of human proximity is detected, the electronic device maintain a higher transmission power (e.g., intensity) for a wireless signal transmitted through a communication circuit.

According to the embodiments disclosed in the disclosure, when human proximity is detected to a sufficient degree, the transmission power of the wireless signal may be reduced, which in turn may reduce an incidence and/or intensity of electromagnetic waves on the proximate human body.

In addition, the disclosure may provide various effects that are directly or indirectly recognized.

BRIEF DESCRIPTION OF THE DRAWINGS

With regard to description of drawings, the same or similar components may be marked by the same or similar reference numerals.

DETAILED DESCRIPTION

Hereinafter, certain embodiments of the disclosure will be described with reference to the accompanying drawings.

Accordingly, those of ordinary skill in the art will recognize that modification, equivalent, and/or alternative on the certain embodiments described herein can be variously made without departing from the scope of the disclosure.

Figure 1:
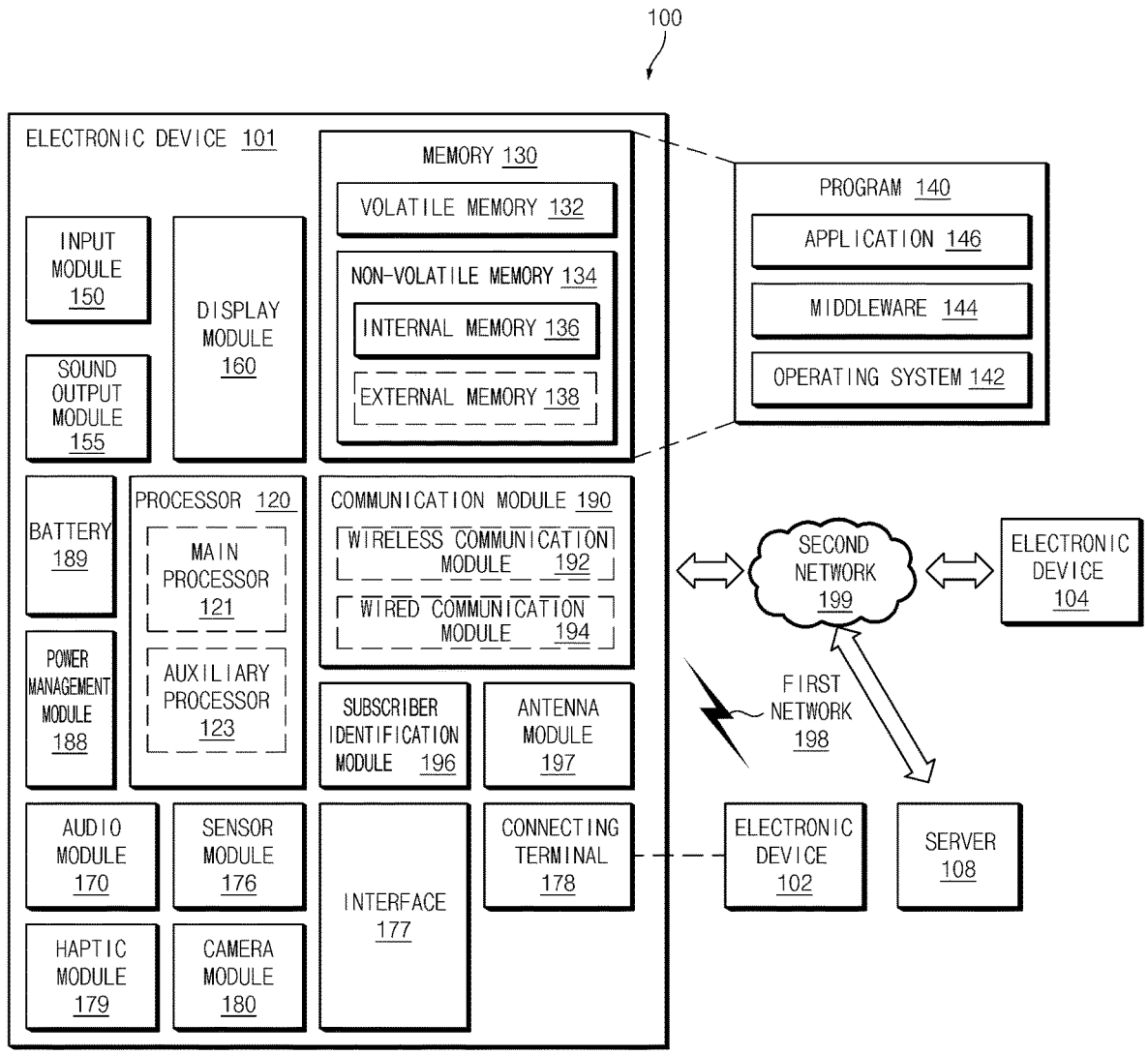
FIG. 1 is a block diagram illustrating an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
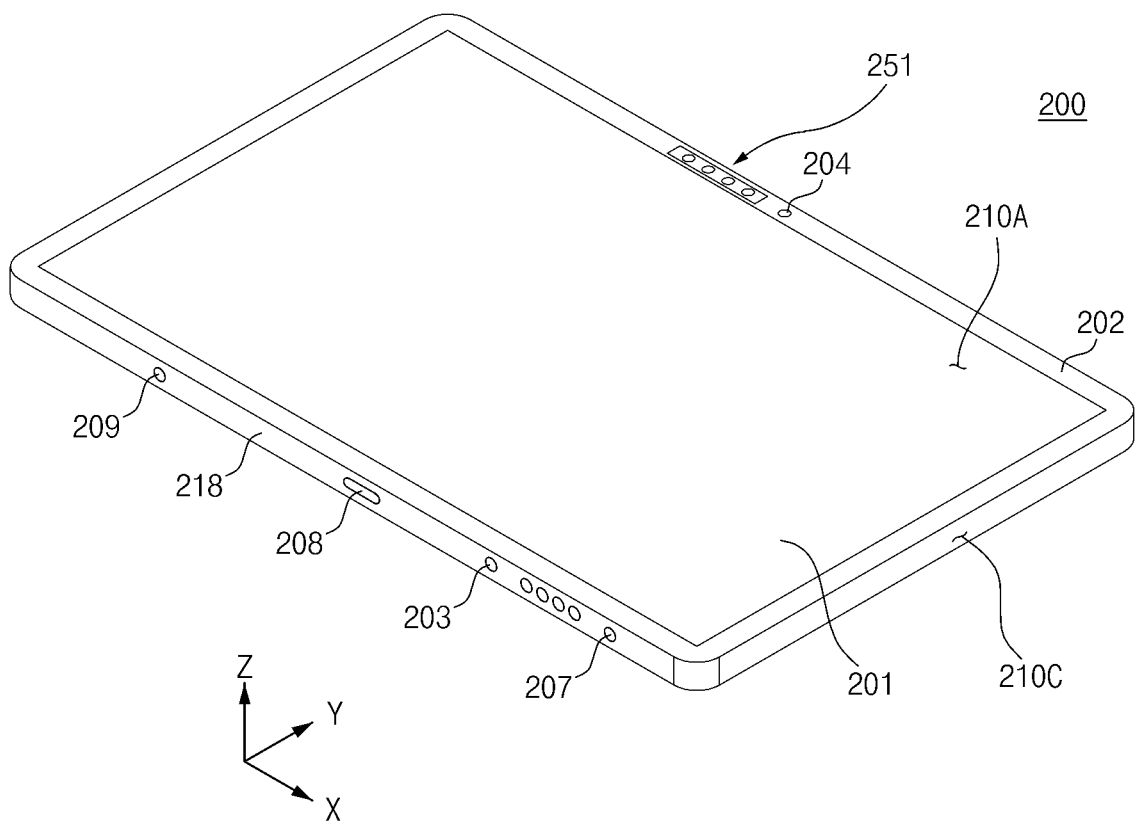
FIGS. 2A and 2B are views illustrating an electronic device according to certain embodiments.
Figure 2B:
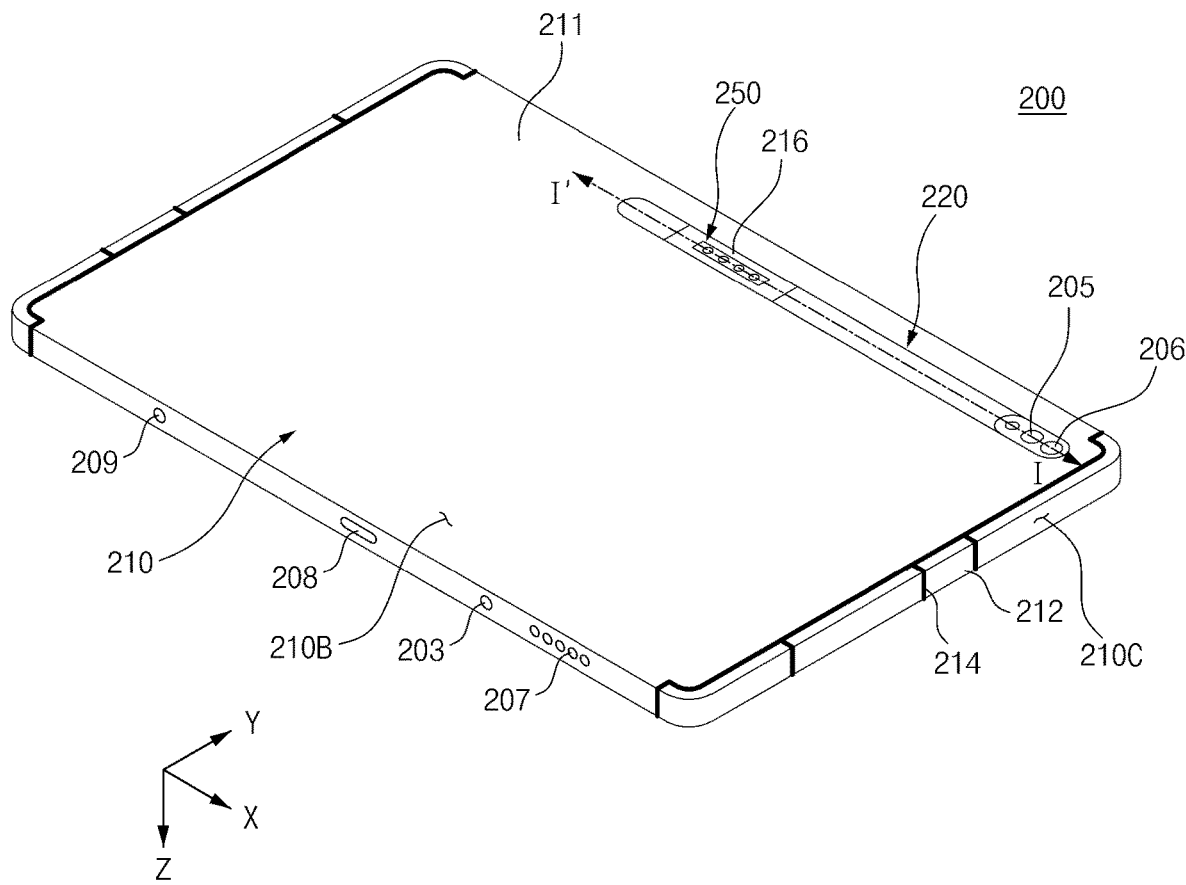

FIG. 2A is a perspective view illustrating a front surface of an electronic device 200 (e.g., the electronic device 101 of FIG. 1) according to an embodiment. FIG. 2B is a perspective view of a rear surface of the electronic device 200 according to an embodiment.

Referring to FIGS. 2A and 2B, the electronic device 200 may include a housing 210 including a first surface (or a front surface) 210A, a second surface (or a rear surface) 210B, and a side surface 210C that surrounds a space between the first surface 210A and the second surface 210B.

In another embodiment (not illustrated), the housing 210 may refer to a structure that forms some of the first surface 210A, the second surface 210B, and the side surfaces 210C of FIG. 2A.

According to an embodiment, the first surface 210A may be defined by a front plate 202 (e.g., a glass plate or a polymer plate including various coating layers), at least a portion of which is substantially transparent. The second surface 210B may be defined by a substantially opaque rear plate 211. The rear plate 211, for example, may be formed of coated or colored glass, ceramics, a polymer, a metal (e.g., aluminum, stainless steel (STS), or magnesium), or a combination of at least two thereof. The side surface 210C may be coupled to the front plate 202 and the rear plate 211, and may be defined by a side bezel structure 218 including a metal and/or a polymer.

In an embodiment, the rear plate 211 and the side bezel structure 218 may be integrally formed and may include the same material (e.g., a metallic material such as aluminum).

In another embodiment, the side surface 210C of the housing 210 may include a plurality of conductive areas 212, and division areas 214 disposed between the plurality of conductive areas 212. The side areas may be divided by the plurality of division areas 214. The conductive areas 212 divided by the division areas 214 may be operated as individual antenna areas. The conductive areas 212 may be divided to have a specific length to transmit or receive a signal of a specific frequency band. The division areas 214 may be filled with a material having an insulative property. For example, the division areas 214 may be filled with a polymer material formed through an injection-molding process. The division areas 214 may insulate the adjacent conductive areas 212 used as antenna areas of different frequency bands, and may prevent foreign substances from penetrating from entering the housing 210 as well.

In an embodiment, the electronic device 200 may include at least one of a display 201, audio modules, a sensor module (not illustrated), camera modules 204, 205, and 206, a key input device, and a connector hole 208. In some embodiments, at least one (e.g., the key input device) of the components may be omitted from the electronic device 200 or another component may be additionally included in the electronic device 200.

The display 201 may be visually exposed through most of the front plate 202. In some embodiments, at least a portion of the display 201 may be exposed through the front plate 202 including the first surface 210A, and some areas of the side surfaces 210C.

In some embodiments, corners of the display 201 may be formed in a shape that is substantially the same as an adjacent outer shape of the front plate 202. In other embodiments (not illustrated), to expand the area, by which the display 201 is visually exposed, the intervals between the edges of the display 201 and the edges of the front plate 202 may be substantially the same.

In another embodiment (not illustrated), at least one of the audio modules 203 and 207, the sensor module (not illustrated), the camera modules 204, 205, and 206, and a light emitting element (not illustrated) may be included on a portion of the screen display area of the display 201. In other embodiments (not illustrated), the display 201 may be coupled to or be disposed to be adjacent to a touch sensing circuit, a pressure sensor that may measure the strength (i.e., the applied pressure) of a touch contact, and/or a digitizer that detects a stylus pen of a magnetic field type.

In an embodiment, the sensor module (not illustrated) may generate an electrical signal or a data value corresponding to an operational state of the interior of the electronic device 200 or an environmental state of the external environment. For example, the sensor module may include at least one of a proximity sensor, an heart-rate monitor (HRM) sensor, a fingerprint sensor, a gesture/motion sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, and an illumination sensor.

The camera modules 204, 205, and 206 may include the first camera device 204 exposed through the first surface 210A of the electronic device 200, and the second camera device 205 and/or a flash 206 exposed through the second surface 210B. At least any of the second camera device 205, the flash 206, and a first antenna module 250 which may overlap a slot area 220 of the housing 210. The slot area 220 may be formed of a nonconductive material, such as at least one of glass, ceramics, and plastic. The camera devices 204 and 205 may include one or a plurality of lenses, an image sensor, and/or an image signal processor. The flash 206, for example, may include a light emitting diode or a xenon lamp. In some embodiments, two or more lenses (an infrared ray camera or a wide angle/telephoto lens), and image sensors may be disposed on one surface of the electronic device 200.

According to an embodiment, the audio modules may include the microphone hole 203 and the speaker hole 207. In an embodiment, a microphone for obtaining an external sound may be disposed in the interior of the microphone hole 203. In some embodiments, the microphone may include a plurality of microphones to sense a direction of sound.

In an embodiment, the speaker hole 207 may include an external speaker hole and a communication receiver hole. In some embodiments, the speaker hole 207 and the microphone may be implemented with one hole. In an embodiment, the electronic device 200 may include a speaker communicated with the speaker hole. In some embodiments, the speaker may include a piezoelectric speaker, from which the speaker hole 207 is omitted.

In an embodiment, the connector holes 208 and 209 may accommodate connectors. In an embodiment, the connector holes 208 and 209 may be disposed on the side surface 210C of the housing 210. In some embodiments, the electronic device 200 may include the first connector hole 208 that may accommodate a connector (e.g., a USB connector) for transmitting and receiving electric power and/or data to and from an external electronic device and/or the second connector hole (e.g., an earphone jack) 209 that may accommodate a connector (e.g., an earphone jack) for transmitting and receiving an audio signal to and from the external electronic device.

According to certain embodiments, the electronic device may include at least one communication device that uses a millimeter wave (e.g., a band of 25 GHz or more) as an operation frequency band. According to an embodiment, the communication device (e.g., a first communication device 216) may include the first antenna module 250 that forms a beam in a rearward direction (e.g., the −Z axis direction), and a second antennal module 251 that forms a beam in a forward direction (e.g., the +Z axis direction).

Figure 3:
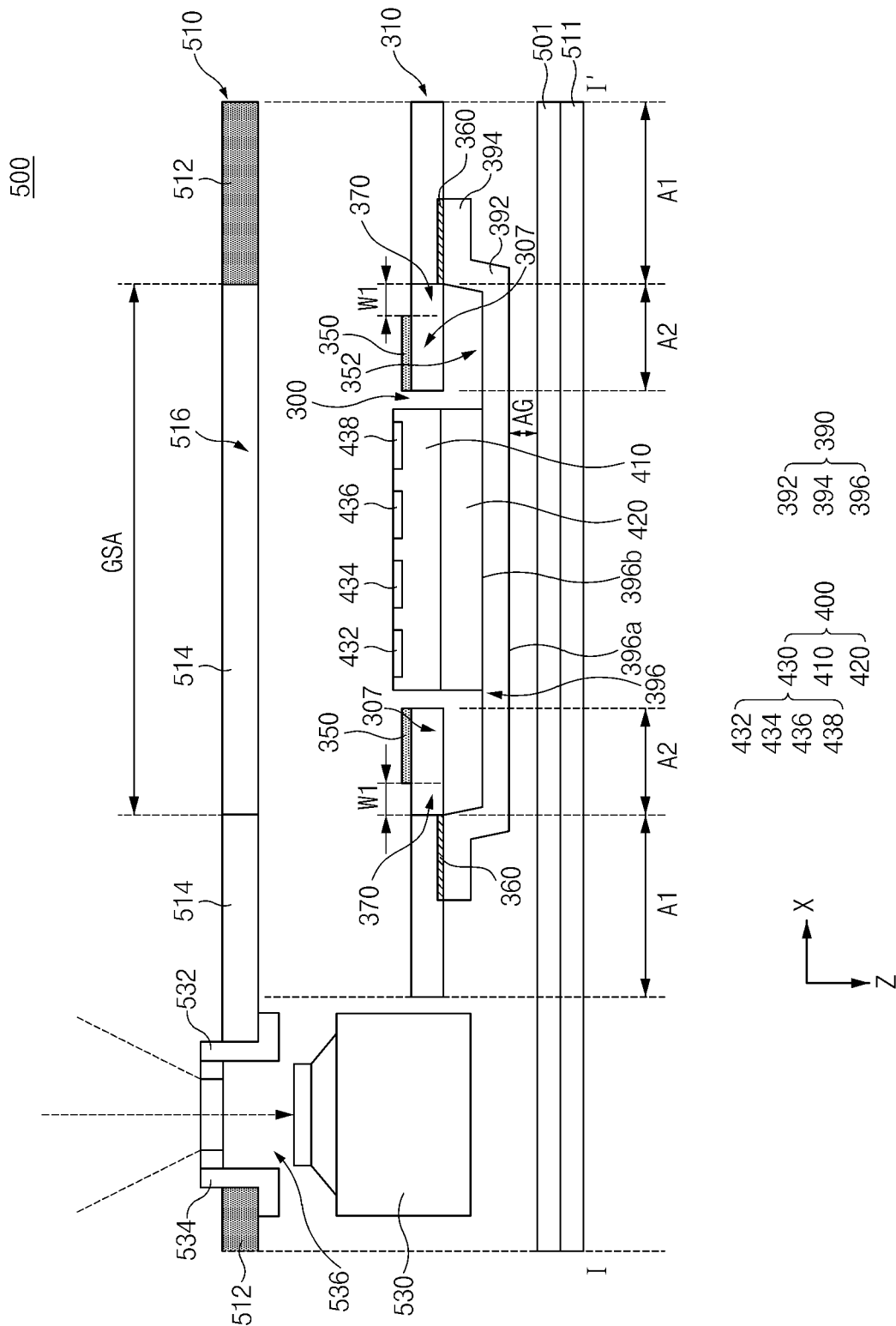
FIG. 3 is a cross-sectional view of an electronic device including a grip sensing pad according to certain embodiments.
Figure 4:
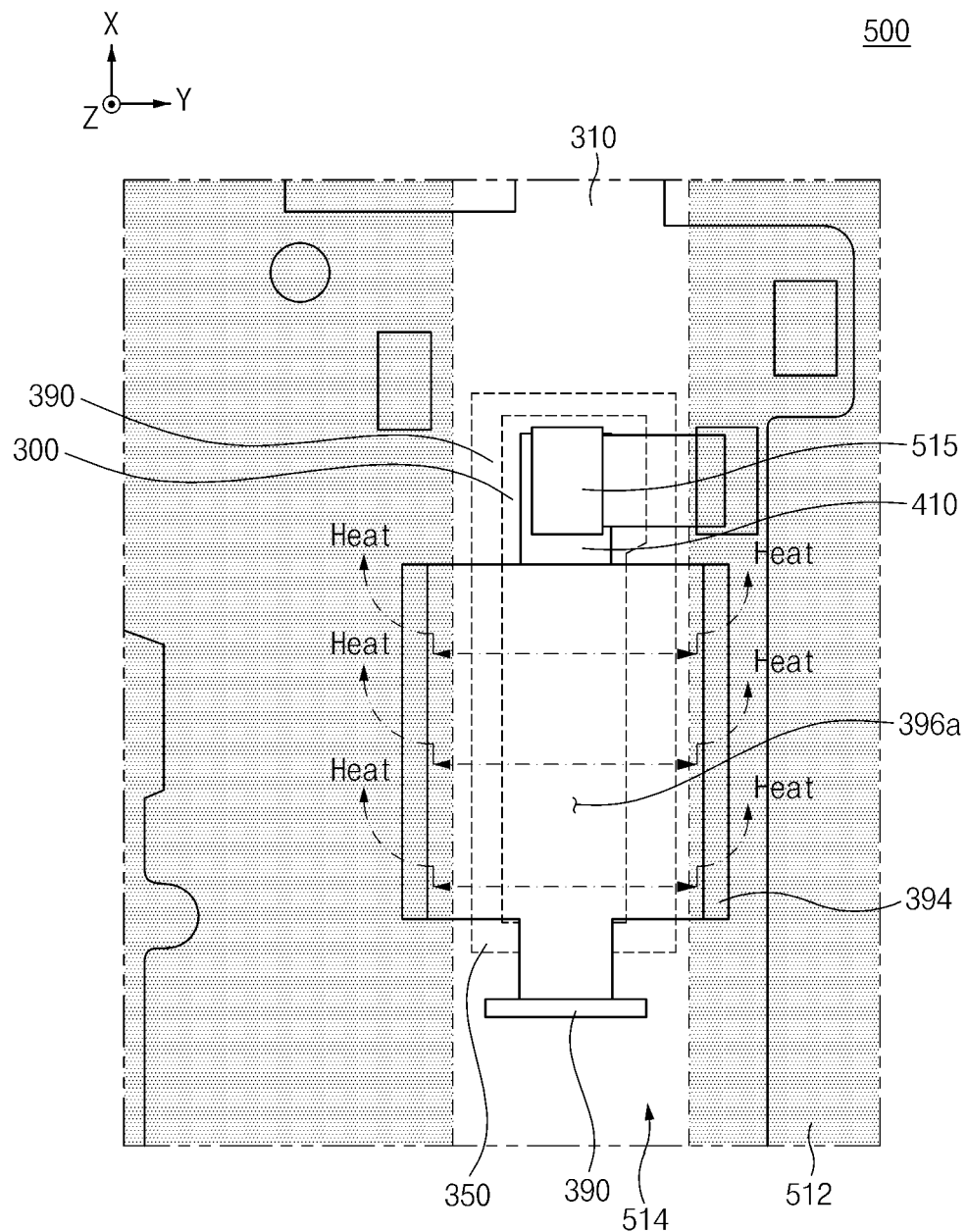
FIG. 4 is a view illustrating a disposition relationship between a support frame and a second plate according to certain embodiments.
Figure 5:
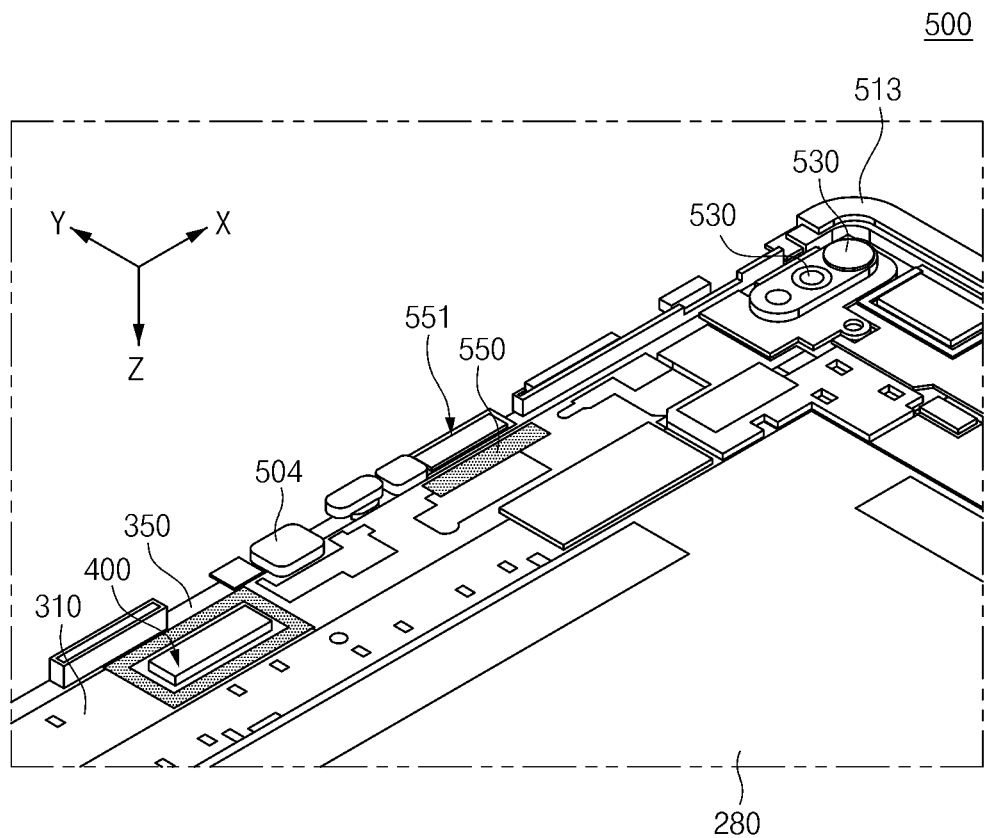
FIG. 5 illustrates an electronic device, from which a second plate is omitted, according to certain embodiments.

FIG. 3 is a cross-sectional of an electronic device 500 according to an embodiment of the present disclosure. FIG. 4 is a plan view illustrating a rear surface of a support frame 390 illustrated in FIG. 3. FIG. 5 is a perspective view illustrating the electronic device 500, from which a second plate 510 coupled to a side member 513 is omitted, according to an embodiment.

Referring to FIGS. 3 to 5, the electronic device 500 according to an embodiment may include a housing (e.g., the housing 210 of FIG. 2), a display 501, a first printed circuit board 310, a first antenna module 400, the support frame 390, and a first grip sensing pad 350. At least one of the components of the electronic device 500 according to an embodiment may be the same as or similar to at least one of the components of the electronic device 200 of FIG. 2A or 2B, and a repeated description thereof will be omitted.

The housing may include a first plate 511 (e.g., the front plate 202 of FIG. 2) that faces the first direction (e.g., the +Z direction), the second plate 510 (e.g., the rear plate 211 of FIG. 4) that faces the second direction (e.g., the −Z direction), and the side member 513 (e.g., the side bezel structure 218 of FIG. 2).

The second surface of the second plate 510 may include a first housing area 512, and at least one second housing area 514. According to an embodiment, the first housing area 512 may be formed of a conductive material, such as aluminum, stainless steel (STX), or magnesium. According to another embodiment, the first housing area 512 may be formed by surface-treating a nonconductive material on a metallic material. For example, the surface-treatment process may be at least any one of an anodizing process, a color coating process, and a ceramic film coating process. The first housing area 512 may be integrally formed with a conductive area (e.g., the conductive area 212 of FIGS. 2A and 2B) of the second plate 510 and may be formed of the same material as the conductive area of the second plate 510.

The at least one second housing area 514 may be disposed in a slot 516 that passes through the first housing area 512. The at least one second housing area 514 may be formed of a nonconductive material, such as at least one of glass, ceramics, and plastic. For example, the second housing area 514 may be formed by stacking a slot filled with a nonconductive plastic material and a cover including a nonconductive glass material through injection-molding. The extent of the cover area may be larger than that of the slot.

When the rear surface (e.g., a surface in the −Z direction) of the second plate 510 is formed of a metallic material, the second housing area 514 may be formed to accommodate an antenna array 430 that radiates waves towards the rear surface (e.g., a surface in the −Z direction) of the electronic device.

According to an embodiment, the second housing area 514 may be disposed to correspond to the antenna array 430 and the first grip sensing pad 350. According to another embodiment, when the second housing area 514 includes a cover area, the at least one slot 516 may have a size that is larger than that of the antenna array 430 and the first grip sensing pad 350. According to another embodiment, the second housing area 514 may include a nonconductive area and be disposed in areas corresponding to a front camera 504 and a rear camera module, as well as the antenna array 430 and the first grip sensing pad 350. According to another embodiment, the second housing area 514 may be disposed at locations corresponding to the antenna array 430, the first grip sensing pad 350, and the rear camera module. Meanwhile, the rear camera module may include a rear camera 530, a camera window 534, and a camera housing 532. The camera housing 532 may include an opening 536, in which the camera window 534 is disposed. The camera window 534 may be disposed such that light is introduced into the rear camera 530 from an external environment. Furthermore, the camera window 534 may function to seal the camera housing 532 to prevent foreign substances from entering the rear camera 530.

The support frame 390 may function to adjust a height of the antenna module 400 and support the antenna module 400. The support frame 390 may be disposed in a space between the first plate 511 and the second plate 510. For example, the support frame 390 may be disposed between the antenna module 400 and the display 501.

The support frame 390 may include a first frame area 396, a second frame area 394, and a side frame area 392. At least any one of the first frame area 396, the second frame area 394, and the side frame area 392 may be formed of a conductive material.

The first frame area 396 may be disposed between the antenna module 400 and the display 501. The antenna module 400 may be disposed on the first frame area 396. Because the first frame area 396 is spaced apart from the display 501 with an air gap "AG" being interposed therebetween, heat generated by the antenna module 400 may be rapidly cooled in the air. A first surface (e.g., a surface that faces the +Z axis direction) 396a of the first frame area 396 is a surface that faces the display 501, and a second printed circuit board 410 may be disposed on a second surface (e.g., a surface that faces the −Z axis direction) that faces an opposite direction to the first surface.

The second frame area 394 may contact a front surface (e.g., a surface that faces the +Z direction) of the first printed circuit board 310 through a solder pad 360. The second frame area 394 may be coupled to conductive layer (e.g., a ground layer) formed in the first printed circuit board 310 through the solder pad 360. Accordingly, noise radiated from an RFIC 420 of the antenna module 400 may be shielded, and/or the heat generated by the antenna module 400 may be effectively dispersed.

The side frame area 392 may be bent towards the second frame area 394 from the first frame area 396. According to a degree of the bending of the side frame area 392, a protrusion height between the antenna module 400 and the first printed circuit board 310 may be adjusted. The side frame area 392 may be disposed to surround the first frame area 396 between the first frame area 396 and the second frame area 394 to provide a holding space 352. The antenna module 400 including the antenna array 430, the second printed circuit board 410, and the RFIC 420 may be disposed in the holding space 352 of the support frame 390. The support frame 390 may support and fix the antenna module 400.

According to an embodiment, the first frame area 396 may overlap the antenna module 400 and the first grip sensing pad 350. Accordingly, the first frame area 396 may overlap the second housing area 514 of the second plate 510. At least a portion of the second frame area 394 may overlap the first housing area 512 of the second plate 510. For example, the second frame 394 disposed on one side (e.g., a side that faces the +X direction) with respect to the first frame area 396 may overlap the first housing area 512 of the second plate 510. For example, the second frame 394 disposed on one side (e.g., a side that faces the −X direction) with respect to the first frame area 396 may overlap the first housing area 512 of the second plate 510. The side frame area 392 may overlap at least any one of the first housing area 512 and the second housing area 514 of the second plate 510.

A processor (e.g., the processor 120 of FIG. 1), a memory (e.g., the memory 130 of FIG. 1), an interface (e.g., the interface 177 of FIG. 1), an antenna module (not illustrated), and/or a wireless communication circuit (e.g., the wireless communication module 192 of FIG. 1) may be disposed on the first printed circuit board 310. The processor 120, for example, may include one or more of a central processing unit (CPU), an application processor (AP), a graphic processing unit (GPU), an image signal processor (ISP), a sensor hub processor (SHP), or a communication processor (CP). The memory, for example, may include a volatile and/or nonvolatile memory. The interface, for example, may include a high definition multimedia interface (HDMI), a universal serial bus (USB), an SD card interface, and/or an audio interface. The interface, for example, may electrically or physically connect the electronic device 500 to an external electronic device (e.g., the electronic device 102 and 104 of FIG. 1), and may include a USB connector, an SD card/MMC connector, or an audio connector. The wireless communication circuit may be the radio frequency integrated circuit (RFIC) 420. For example, the wireless communication circuit may feed an electrical signal to the protrusion formed at least a portion of the housing.

The first printed circuit board 310 may include a cavity 300 that overlaps the antenna module 400. The first antenna module 400 may be disposed in the cavity 300 of the first printed circuit board 310. The first printed circuit board 310, in which the grip sensing pad 350 is disposed, may be spaced apart from the second printed circuit board 410, in which the antenna module 400 is disposed, with a space interposed therebetween. The second printed circuit board 410 may protrude further than the first printed circuit board 310, or alternatively, the first printed circuit board 310 may be disposed at a height of the same plane as the second printed circuit board 410.

According to an embodiment, an intermediate frequency integrated circuit (IFIC) may be disposed in the first printed circuit board 310. The IFIC may up/down convert a millimeter wave (mmWave) signal that is transmitted and received through the first antenna module 400. Because the first antenna module 400 is disposed in the cavity 300 of the first printed circuit board 310, it may be disposed close to the IFIC disposed in the first printed circuit board 310. Accordingly, loss of a millimeter wave (mmWave) signal transmitted and received through the first antenna module 400 may be prevented.

The first printed circuit board 310 may include a circuit area A1 and a fill-cut area A2. At least a portion of the circuit area A1 may overlap the first housing area 512 of the second plate 510. For example, the circuit area A1 disposed on one side (a side that faces the +X direction) with respect to the second printed circuit board 410 may overlap the first housing area 512 of the second plate 510. The circuit area A1 disposed on an opposite side (a side that faces the −X direction) with respect to the second printed circuit board 410 may overlap the second housing area 514 of the second plate 50. The fill-cut area A2 may overlap the second housing area 514 of the second plate 510.

The circuit area A1 may include a plurality of conductive layers and a plurality of insulation layers. The plurality of conductive layers and the plurality of insulation layers may be stacked alternately. The circuit area A1 may provide electrical connections for the first printed circuit board 310 and various electronic components disposed on the exterior thereof by using wiring lines and via holes using the conductive layer.

The fill-cut area A2 is a nonconductive area, in which the remaining layers of the first printed circuit board 310, except for the first grip sensing pad 350, are formed via the non-conductive layers, and may be an area that includes the insulation layer while the conductive layers included in the circuit area A1 are not disposed. The fill-cut area A2 may extend into the holding space 352 of the support frame 390 toward the antenna module 400. The fill-cut area A2 of the first printed circuit board 310 may be disposed to overlap the holding space 352 of the support frame 390. The fill-cut area A2 of the first printed circuit board 310 may include a first fill-cut area 370 and a second fill-cut area 307. The first fill-cut area 370 may be disposed between the circuit area A1 and the second fill-cut area 307. The first fill-cut area 370 may be an area that does not overlap the first grip sensing pad 350. The second fill-cut area 307 may be disposed to be spaced apart from the antenna module 400. The second fill-cut area 307 may be an area that overlaps the first grip sensing pad 350.

The electronic device 500 according to an embodiment may include a plurality of antenna modules. The plurality of antenna modules may include the first antenna module 400 and a second antenna module 551. At least one of the first antenna module 400 and the second antenna module 551 may output an oriented and/or all-direction wireless signal based on disposition of an antenna array. The first antenna module 400 may be configured to radiate a frequency of a specific frequency band (e.g., a millimeter wave or "mmWAve" frequency band) in the first direction (e.g., the −Z direction) of the electronic device 500. The second antenna module 551 may be configured to radiate a frequency of a specific frequency band (e.g., a mmWAve frequency band) in the second direction (e.g., the +Z direction) of the electronic device. For example, the first antenna module 400 and the second antenna module 551 may radiate an oriented signal in different directions. The first antenna module 400 may be oriented in the first direction (e.g., the −Z direction or the rearward direction), and the second antenna module 551 may be oriented in the second direction (e.g., the +Z direction or the forward direction) that is opposite to the first direction.

At least one of the first antenna module 400 and the second antenna module 551 may include at least one of a patch antenna, a monopole antenna, a spiral antenna, a wave antenna, a loop antenna, a Vivaldi antenna, and a holographic antenna.

The first antenna module 400 may include the second printed circuit board 410, the antenna array 430, and the radio frequency integrated circuit (RFIC) 420. The second printed circuit board 410 may be a portion of the first printed circuit board 310, or may be formed separately from the first printed circuit board 310 to be electrically connected to the first printed circuit board 310.

The second printed circuit board 410 may be electrically connected to the first printed circuit board 310 through a connection member 515. The second printed circuit board 410 may include a first surface (a surface that faces the +Z direction) that contacts the support frame 390, and a second surface that is opposite to the first surface. A wireless communication circuit (e.g., the radio frequency integrated circuit (RFIC)) may be disposed on the first surface of the second printed circuit board 410, and at least one antenna array 430 may be formed in some of the layers, including the second surface of the second printed circuit board 410. Then, the antenna array 430 may not overlap another conductive layer, in the combined form of a dipole antenna and a patch antenna.

The antenna array 430 may include a plurality of antennas 432, 434, 436, and 438 disposed to form an directional beam. The plurality of antennas 432, 434, 436, and 438 may be disposed in a row in the electronic device 500 that is miniaturized. For example, in the antenna array, the plurality of antennas 432, 434, 436, and 438 may be arranged in a one by four scheme. The plurality of antennas 432, 434, 436, and 438 may be formed in an interior of the second printed circuit board 410, or may be formed on one surface of the second printed circuit board 410. The antenna array 430 may include a plurality of antennas of the same or different shapes or kinds. At least any one of the plurality of antennas included in the antenna array 430 may include at least one of a patch antenna, a monopole antenna, a spiral antenna, a wave antenna, a loop antenna, a Vivaldi antenna, and a holographic antenna. For example, the plurality of antennas 432, 434, 436, and 438 included in the antenna array 430 may be patch antennas. The patch antennas are small and light, the antenna array 430 including the patch antennas may be easily arranged, and the patch antennas may be easily integrated in the second printed circuit board 410 or the flexible circuit board and may be easily polarized. The patch antennas may be suitable for the second printed circuit board 410 or the flexible printed circuit board having a low permittivity and a large thickness. One or a plurality of antenna arrays 430 may be provided. For example, when the antenna array 430 include a first antenna array and a second antenna array, the first antenna array may include a plurality of patch antennas and the second antenna array may include a plurality of dipole antennas.

The RFIC 420 may be spaced apart from the antenna array 430. For example, the RFIC 420 may be disposed on the first surface of the second printed circuit board 410 so as to be spaced apart from the antenna array 430 disposed on the second surface of the second printed circuit board 410. The RFIC 420 may be configured to process a signal of a selected frequency band, which is transmitted and received through the antenna array 430. The RFIC 420 may convert a base band signal acquired from the communication processor (not illustrated) to an RF signal of a specific band (e.g., a mmWave band (a band of 3 GHz to 300 GHz)). The RFIC 420 may convert the RF signal received through the antenna array 430 to a base band signal and deliver the base band signal to the communication processor when the RF signal is received.

The electronic device according to an embodiment may include at least one grip sensing pad 350 and 550 that may determine a grip state of the electronic device (e.g., whether a user is holding/gripping the device, and/or characteristics of that grip). The at least one grip sensing pad may include the first grip sensing pad 350 and the second grip sensing pad 550.

The first grip sensing pad 350 may be disposed at an area of the housing that does not influence a performance of the first antenna module 400. The first grip sensing pad 350 may be disposed to avoid overlapping a radiation direction of the antenna array 430 that radiates electromagnetic waves in a rearward direction (e.g., the −Z direction) of the electronic device 500. For example, the first grip sensing pad 350 may be disposed to surround the first antenna module 400. The first grip sensing pad 350 may be formed in a polygonal, circular, or elliptical band shape, of which a central area corresponding to the first antenna module 400 is empty. For example, the first grip sensing pad 350 may have a rectangular band shape, of which a central area corresponding to the antenna module 400 is empty.

The first grip sensing pad 350 may be disposed to overlap the second housing area 514 of the second plate 510, and may be formed of a conductive material at a location that is proximate and/or actually adjacent to the antenna array 430. The first grip sensing pad 350 may be disposed in at least any one of the first fill-cut area 370 and the second fill-cut area 307 of the first printed circuit board 310. The first grip sensing pad 350 may be formed of at least one conductive layer disposed on the first printed circuit board 310 or at least one conductive layer included in the first printed circuit board 310. For example, the first grip sensing pad 350 may be formed of an uppermost one of the plurality of conductive layers included in the first printed circuit board 310.

Because the first grip sensing pad 350 is disposed at a location that is proximate to and/or adjacent the antenna array 430, a grip sensing coverage area (GSA) using the first grip sensing pad 350 may overlap an area in which the antenna array 430 radiates waves. Accordingly, if a body part, such as a user's finger, approaches a radiation area of the first antenna module 400, the finger of the user may be present in the GSA.

The second grip sensing pad 550 may be disposed to avoid overlapping a radiation direction of the second antenna module 551 that radiates waves in a forward direction (e.g., a surface which the +Z direction faces) of the electronic device 500.

A battery 280 may supply electric power to at least one component of the electronic device 500, and for example, may include a primary battery that cannot be recharged, a secondary battery that may be recharged, or a fuel cell. At least a portion of the battery 280, for example, may be disposed substantially in parallel to at least any one of the first printed circuit board 310 and the second printed circuit board 410. The battery 280 may be integrally disposed in the interior of the electronic device 500, and may be disposed to be detachable from the electronic device 500.

Figure 6A:
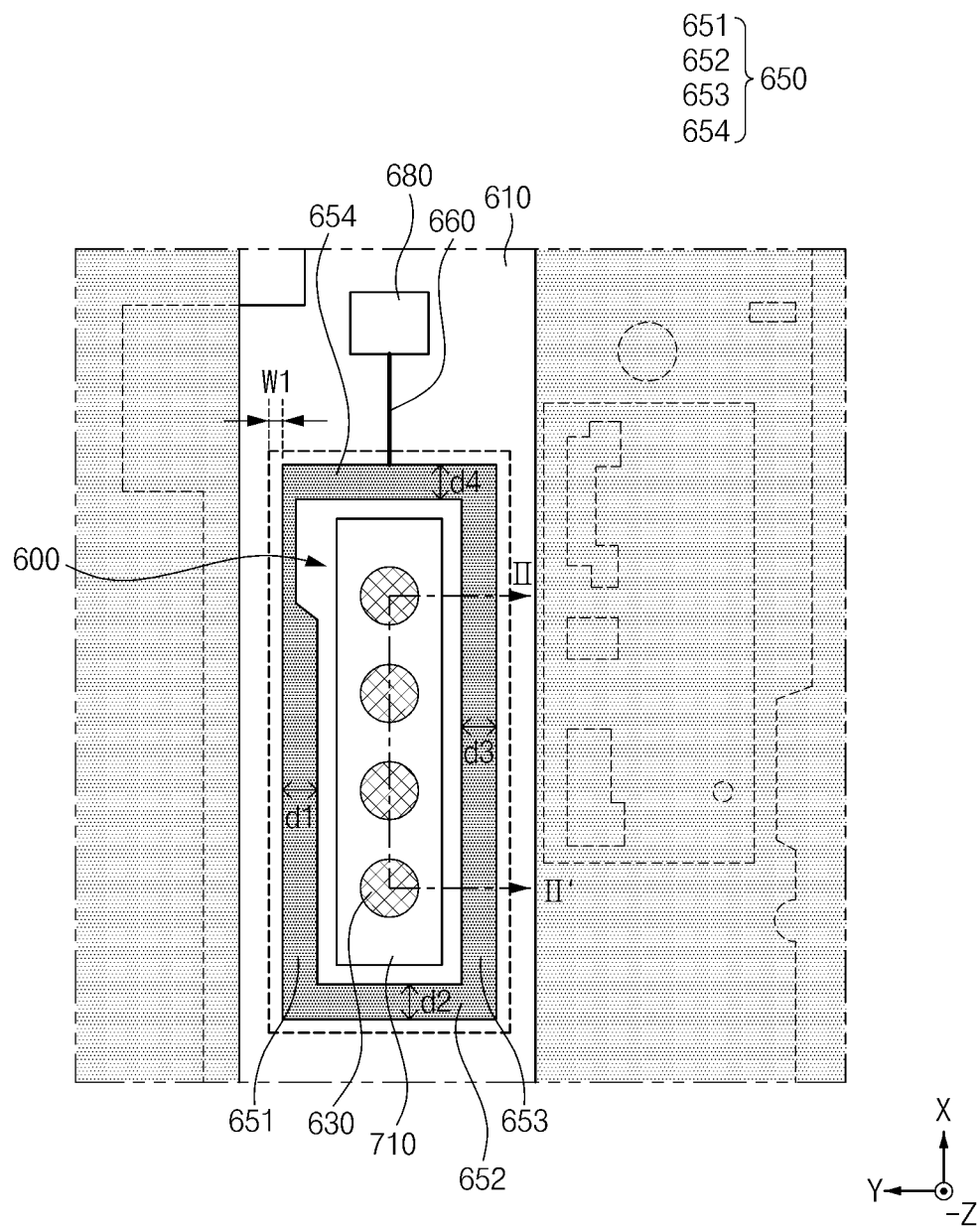
FIGS. 6A and 6B are views illustrating a disposition relationship between a grip sensing pad and an antenna module of an electronic device according to certain embodiments.
Figure 6B:
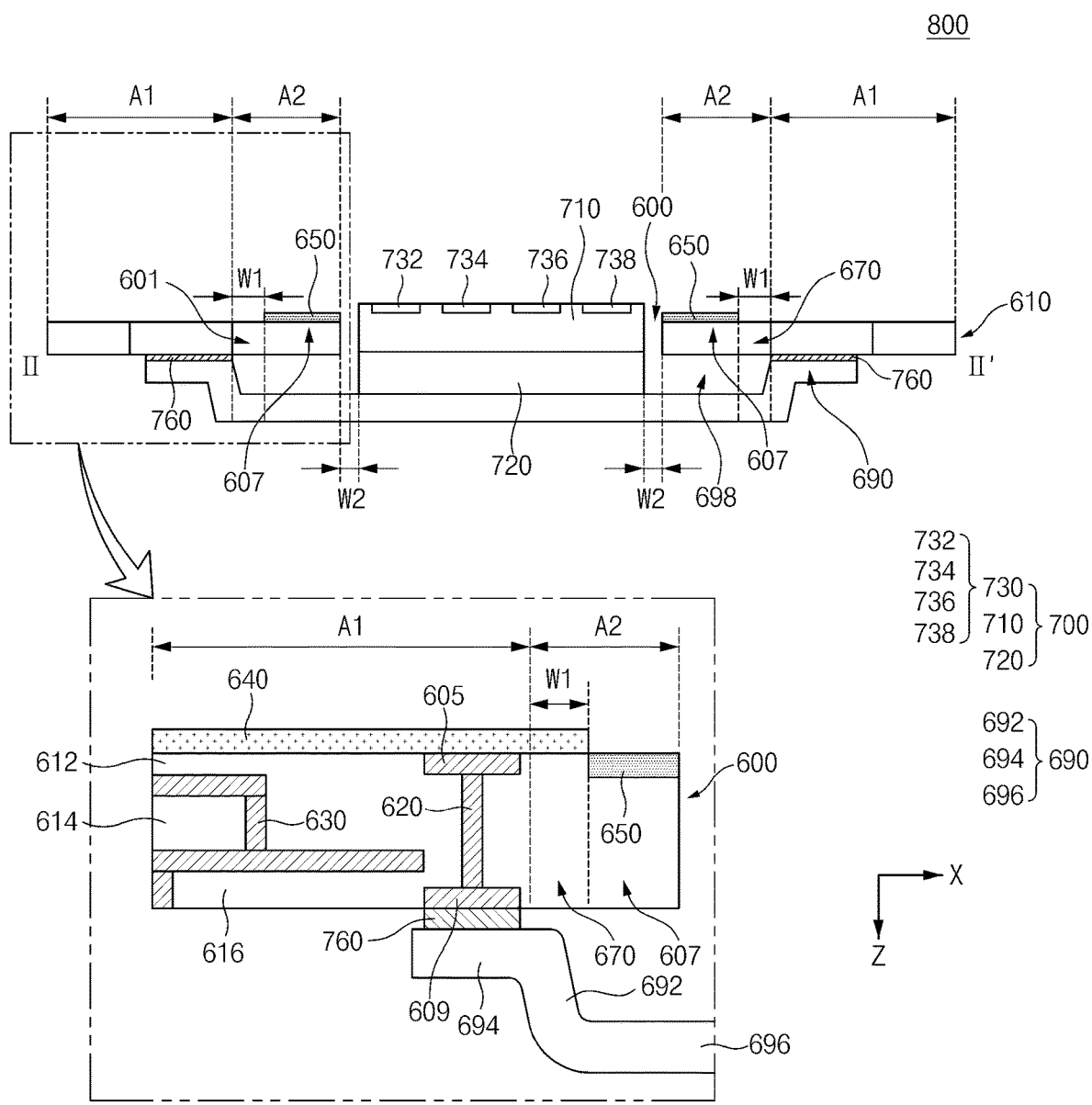

FIG. 6A is a plan view illustrating a grip sensing pad disposed on a first printed circuit board of an electronic device according to an embodiment. FIG. 6B is a cross-sectional view illustrating an electronic device, taken along line FIG. 7 is a view illustrating first and second printed circuit boards before an antenna module and a grip sending pad of an electronic device according to an embodiment are formed.

Figure 7:
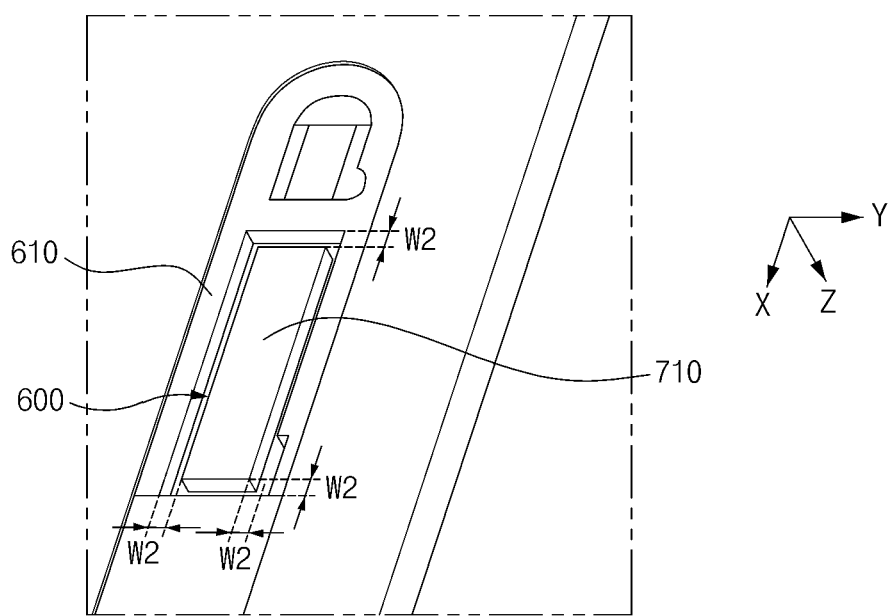
FIG. 7 is a view illustrating a disposition relationship between a first printed circuit board and a second printed circuit board of an electronic device according to certain embodiments.

Referring to FIGS. 6A to 7, a grip sensing pad 650 (e.g., the first grip sensing pad 350 of FIGS. 3 to 5) of an electronic device 800 (e.g., the electronic device 500 of FIGS. 3 to 5) according to an embodiment may be formed independently from an adjacent conductive layer to avoid signal interference with the adjacent conductive layer. For example, the grip sensing pad 650 may be disposed independently from an antenna module 700 disposed on a second printed circuit board 710 (e.g., the second printed circuit board 410 of FIG. 3) and a circuit area A1 of a first printed circuit board 610. Because the grip sensing pad 650 is disposed in the first printed circuit board 610 separate from the second printed circuit board 710, in which the antenna module 700 is disposed, the grip sensing pad 650 may be implemented without reducing an extent of the grip sensing pad 650 such that a specific capacitance may be maintained even though the antenna module 700 is miniaturized.

The grip sensing pad 650 disposed on a second fill-cut area 607 may be spaced apart from a circuit area A1 of the first printed circuit board 610 while a first fill-cut area 670 having a first width W1 being interposed therebetween. The first width W1 of the first fill-cut area 670 and the number of the plurality of stacked insulation layers included in the first fill-cut area 670 may vary according to a desired grip sensing performance and a degree of freedom of an operation of signal wiring lines included in the first printed circuit board 610.

The first printed circuit board 610, in which the grip sensing pad 650 is disposed, may include a cavity 600. The grip sensing pad 650 may be disposed to surround the cavity 600. The antenna module 700 may be disposed in the cavity 600 of the first printed circuit board 610. The first printed circuit board 610, in which the grip sensing pad 650 is disposed, may be spaced apart from the second printed circuit board 710, in which the antenna module 700 is disposed, while a spacing space of a second width W2 interposed therebetween. The second width W2 of the spacing space between the first printed circuit board 610 and the second printed circuit board 710 may be the same or different in upward/downward/leftward/rightward directions.

The grip sensing pad 650 may include first to fourth pad areas 651, 652, 653, and 654. The first pad area 651 may extend in a direction (e.g., the +X direction) that is parallel to an arrangement direction of the plurality of antennas included in an antenna array 730, toward a grip sensing line 660. The first pad area 651 may have a first pad width d1. The second pad area 652 may extend in a direction (e.g., the −Y direction) that crosses the first pad area 651. The second pad area 652 may have a second pad width d2. The third pad area 653 may be formed in parallel to the first pad area 651, and may be disposed to be spaced apart from the first pad area 651 while the second printed circuit board 710 being interposed therebetween. The third pad area 653 may have a third pad width d3. The fourth pad area 654 may be formed in parallel to the second pad area 652, and may be disposed to be spaced apart from the second pad area 652 while the second printed circuit board 710 being interposed therebetween. The fourth pad area 654 may have a fourth pad width d4. Widths d1, d2, d3, and d4 of the first to fourth pad areas 651, 652, 653, and 654 may be the same or different. At least any one of the first to fourth pad areas 651, 652, 653, and 654 may be different according to a location thereof. For example, a width of an area of the first pad area 651, which is adjacent to the fourth pad area 654, may be smaller than a width of an area of the first pad area 651, which is adjacent to the second pad area 652.

When a grip proximity signal is not present, grip sensing performance may be enhanced by optimizing an size of the grip sensing pad 650. When the grip sensing area is expanded by enlarging the size of the grip sensing pad, there may be a functional trade-off in that grip sensing performance is reduced when a level of capacitance therein is greater than a particular threshold capacitance.

For example, at least any one of the first to fourth pad areas 651, 652, 653, and 654 may have a width of about 1 mm to 1.5 mm. A length of at least any one of the first to fourth pad areas 651, 652, 653, and 654 may be about 25 mm to 35 mm, and a total length of the first to fourth pad areas 651, 652, 653, and 654 may be about 25 mm to 35 mm.

The grip sensing pad 650 may be disposed to overlap a support frame 690 including a first frame area 696, a second frame area 694, and a side frame area 692. A holding space 698 may be disposed between the support frame 690 and the grip sensing pad 650. The antenna module 700 including the antenna array 730, the second printed circuit board 710, and an RFIC 720 may be held in the holding space 698 of the support frame 690.

The grip sensing pad 650 may be disposed on the second fill-cut area 607 of the first printed circuit board 610. The grip sensing pad 650 may be disposed at the same height as that of the antenna module 700, or may be disposed to be higher than the antenna module 700.

According to an embodiment, the grip sensing pad 650 may be formed of the same material as that of an uppermost conductive layer 605 of the first printed circuit board 610, and may be disposed on the same plane as that of the uppermost conductive layer 605. Then, a solder resist layer 640 for protecting the first printed circuit board 310 may be removed from an area corresponding to the grip sensing pad 650. The solder resist layer 640 may be disposed in the remaining area of the first printed circuit board 610, except for the grip sensing pad 650. The nonconductive solder resist layer 640 may be disposed to cover the conductive layers 605 and 609, via holes 620 and 630, and insulation layers 612, 614, and 616 disposed in the circuit area A1. The grip sensing pad 650 may be separated from a ground layer 609 connected to the second frame area 694 of the support frame 690, through a solder pad 760. The grip sensing pad 650 may be separated from the ground layer 609 through the first fill-cut area 670 and the second fill-cut area 607.

All layers of the first fill-cut area 670 and the second fill-cut area 607 may include the insulation layers 612, 614, and 616, or may include at least one insulation layer 612, 614, and 616 and at least one conductive layer. The conductive layers included in the first fill-cut area 670 and the second fill-cut area 607 may not be electrically connected to the conductive layers 605 and 609 included in the circuit area A1 and the grip sensing pad 650.

According to an embodiment, the second fill-cut area 607 may include a plurality of layers. An uppermost layer (e.g., a first layer) of the second fill-cut area 607, which is most distant from the support frame 690, may include at least one conductive layer and may be used as the grip sensing pad 650. The remaining layers (e.g., the second layer to the lowermost layer) of the second fill-cut area 607, except for the uppermost layer, may include the at least one second conductive layer and the insulation layers 612, 614, and 616, or may include an insulation layer while omitting the second conductive layer. The second conductive layer included in the second fill-cut area 607 may not be electrically connected to the conductive layers 605 and 609 included in the circuit area A1 and the grip sensing pad 650.

According to certain embodiments, the grip sensing pad 650 may be formed of a separate interposer structure that is different from the uppermost conductive layer included in the first printed circuit board 610. The interposer structure may protrude on the first printed circuit board 610 in a direction (e.g., the −Z axis facing the second plate 510. The interposer structure may include an interposer and at least one printed circuit board to secure an area for grip sensing. For example, the interposer structure may include an interposer, and a third printed circuit board including the grip sensing pad 650 without any fill-cut area. The interposer may electrically connect the grip sensing pad of the third printed circuit board and the first printed circuit board. The grip sensing pad 650 included in the interposer structure may be formed of a separate conductive layer that is different from the uppermost conductive layer included in the first printed circuit board 610. The grip sensing pad 650 included in the interposer structure may be formed on the first printed circuit board 610 lower than the antenna module 700. Accordingly, a height of the antenna module 700 and a height of the grip sensing pad 650 may be similar, such that a certain level of grip sensing performance may be achieved.

The above-described grip sensing pad 650 may detect a sum (e.g., a self-capacitance) of a static capacitance value of the grip sensing pad 650 when there is no contact thereof with an external object, and a load static capacitance value generated when an external object (e.g., a finger of a user) contacts the electronic device (e.g., by gripping the same). Accordingly, the grip sensing pad 650 may generate a grip sensing signal including information related to a degree of grip of the user and a location of the grip. The grip sensing signal generated by the grip sensing pad 650 may be transmitted to a sensing circuit unit 680 through the grip sensing line 660. The sensing circuit unit 680 may be embedded in a processor (e.g., the processor 120 of FIG. 1)

mounted on the first printed circuit board 610 or may be mounted on the first printed circuit board 610 separately from the processor.

The sensing circuit unit 680 may include a circuit that processes at least a portion of a signal received from the grip sensing pad 650. For example, the sensing circuit unit 680 may compare a value of a self-capacitance included in a grip sensing signal received from the grip sensing pad 650 with a threshold value.

The sensing circuit unit 680 may control the maximum power intensity of a wireless signal to be transmitted by a communication circuit (e.g., the RFIC 720 of FIG. 6B) according to whether the value of the self-capacitance corresponds to a range of a threshold value. In an embodiment, an operation decreasing the maximum power intensity of a wireless signal by the communication circuit may be referred to as a "power-back-off" operation.

According to an embodiment, the sensing circuit unit 680 may control a communication module (e.g., the communication module 190 of FIG. 1) such that a power-back-off operation is performed when the self-capacitance value is larger than the threshold value.

According to an embodiment, the sensing circuit unit 680 may control a communication module (e.g., the communication module 190 of FIG. 1) such that a power-back-off operation is not performed, and the maximum power intensity of the wireless signal is maintained, when the self-capacitance value is not more than the threshold value.

According to an embodiment, the sensing circuit unit 680 may be included in the processer (e.g., the processor 120 of FIG. 1).

Figure 8A:
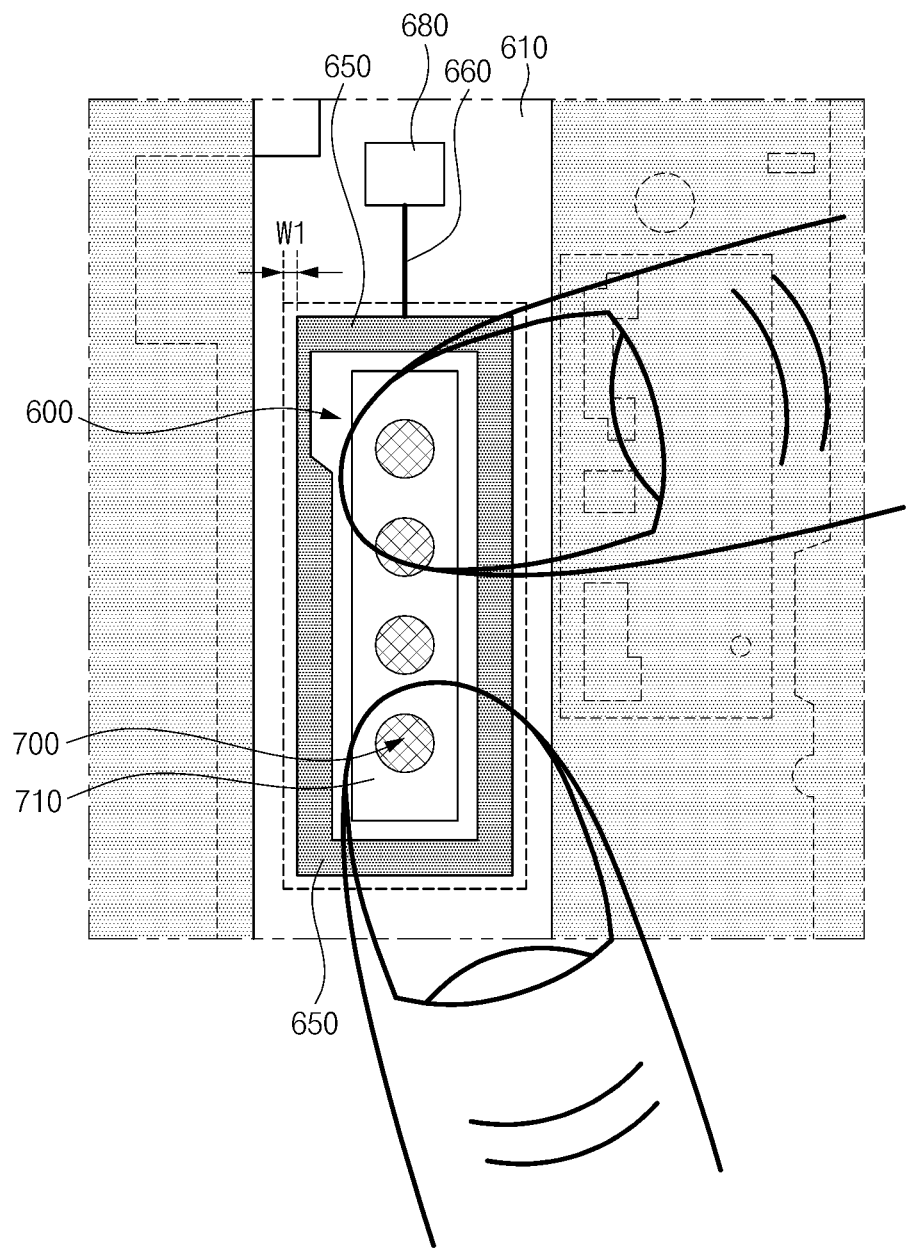
FIGS. 8A and 8B are views illustrating a grip sensing operation using a grip sensing pad of an electronic device according to certain embodiments.
Figure 8B:
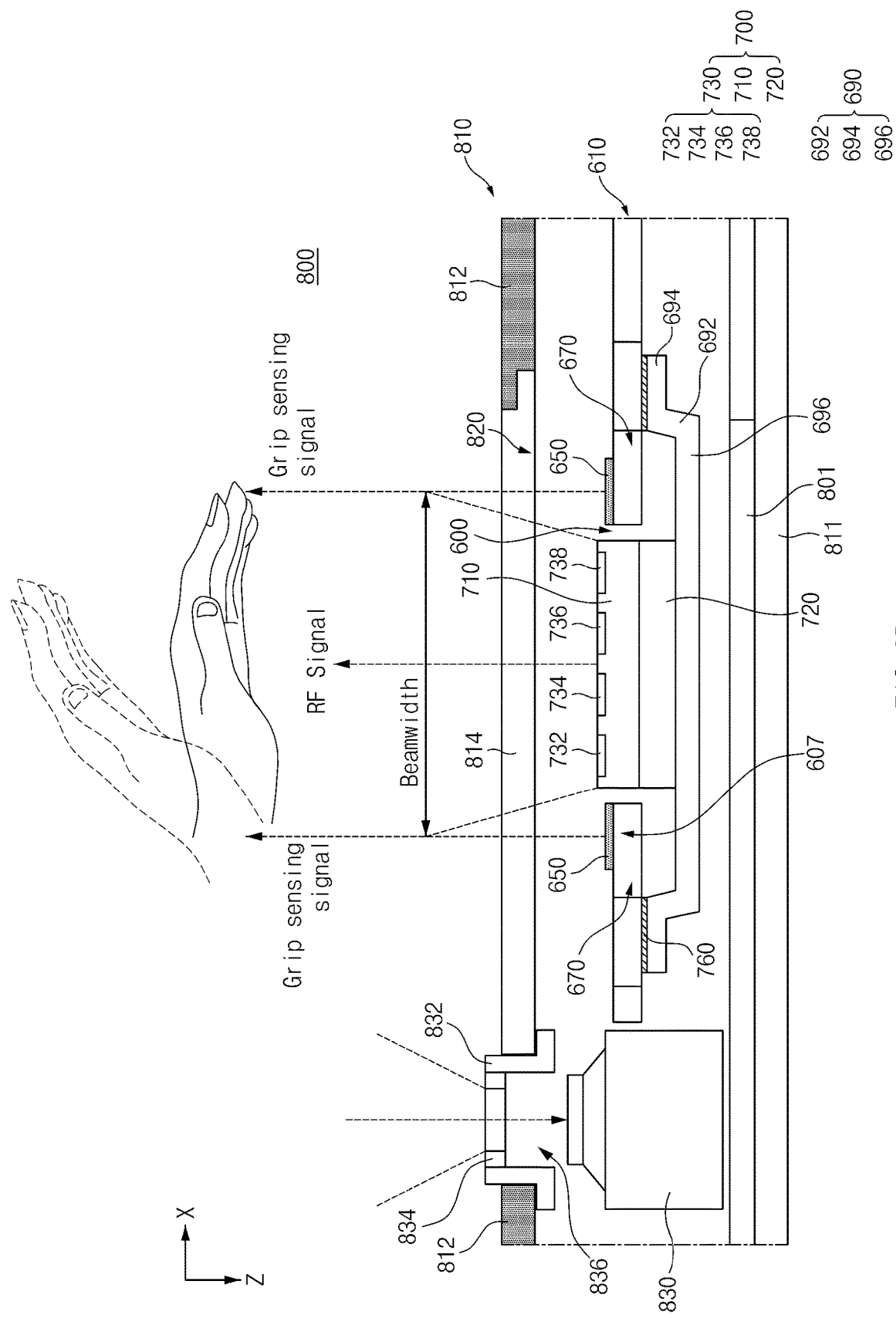

FIGS. 8A and 8B are views illustrating a state, in which a human body contacts a grip sensing pad of an electronic device according to an embodiment. The electronic device described in FIGS. 8A and 8B may include elements that are similar to those of the electronic device described in FIGS. 6A to 7.

Referring to FIGS. 8A and 8B, a rear camera module may be disposed to be adjacent to the first printed circuit board 610 of the electronic device 800 according to an embodiment. The rear camera module may include a rear camera 830, a camera window 834, and a camera housing 832. The camera housing 832 may include an opening 836, in which the camera window 834 is to be disposed. The camera window 834 may be disposed such that light is introduced into the rear camera 830 from an outside. Furthermore, the camera window 834 may function to seal the camera housing 832 to prevent foreign substances (e.g., dust or moisture) from entering into the rear camera 830.

The support frame 690 including the first frame area 696, the second frame area 694, and the side frame area 692 may be spaced apart from a display 801 coupled to a first plate 811 of the electronic device 800 according to an embodiment. The first frame area 696, at least a portion of the second frame area 694, and the side frame area 692 may overlap a second housing area 814 formed in a slot 820 of the second plate 810. The first frame area 696, the remainder of the second frame area 694, and the side frame area 692 may not overlap a first housing area 812 that is a conductive area of the second plate 810.

Furthermore, the grip sensing pad 650 (e.g., the first grip sensing pad 350 of FIGS. 3 to 5) of the electronic device may surround the antenna module 700 (e.g., the first antenna module 400 of FIGS. 3 to 5) at a minimum distance.

The grip sensing operation using the grip sensing pad 650 may be performed in an area towards which the antenna array 730 radiates waves. A grip sensing signal may be generated through the grip sensing pad 650, which may be disposed in a radiation area of the antenna array 730. Then, because the antenna module 700 includes small-sized patch antennas 732, 734, 736, and 738, an intersection area (overlapping area) may be present between an area, in which a beam pattern having a specific beam width in the patch antennas 732, 734, 736, and 738 is radiated, and a grip sensing coverage are present. Accordingly, when a body portion, such as a user's finger, approaches a radiation area of the antenna module 700, the finger of the user may be present in the grip sensing coverage.

For example, when the human body external object approaches a radiation area of the antenna module 700, the grip sensing pad 650 may overlap with the external object, and the second housing area 814, as formed in a slot 820, may be interposed therebetween. The grip sensing pad 650 that overlaps the external object may include a self-capacitance. When the human body approaches the grip sensing pad 650, self-capacitance may increase. Thus a change in the self-capacitance may be detected through the grip sensing pad 650, and through this, the proximity of the human body to the radiation area of the antenna module 700 may be detected.

Figure 9:
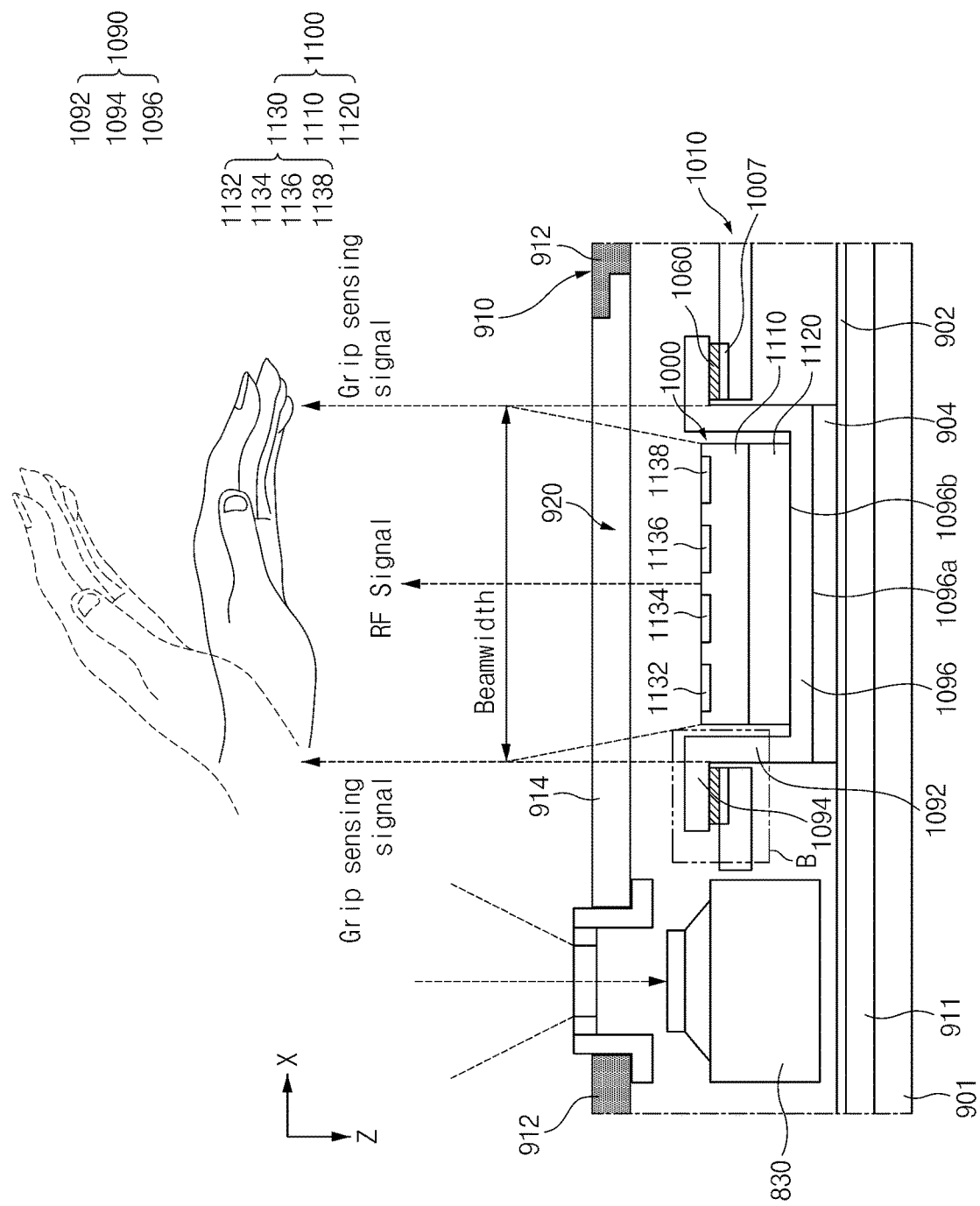
FIG. 9 is a cross-sectional view of an electronic device including a support frame that functions as a grip sensing pad according to certain embodiments.
Figure 10:
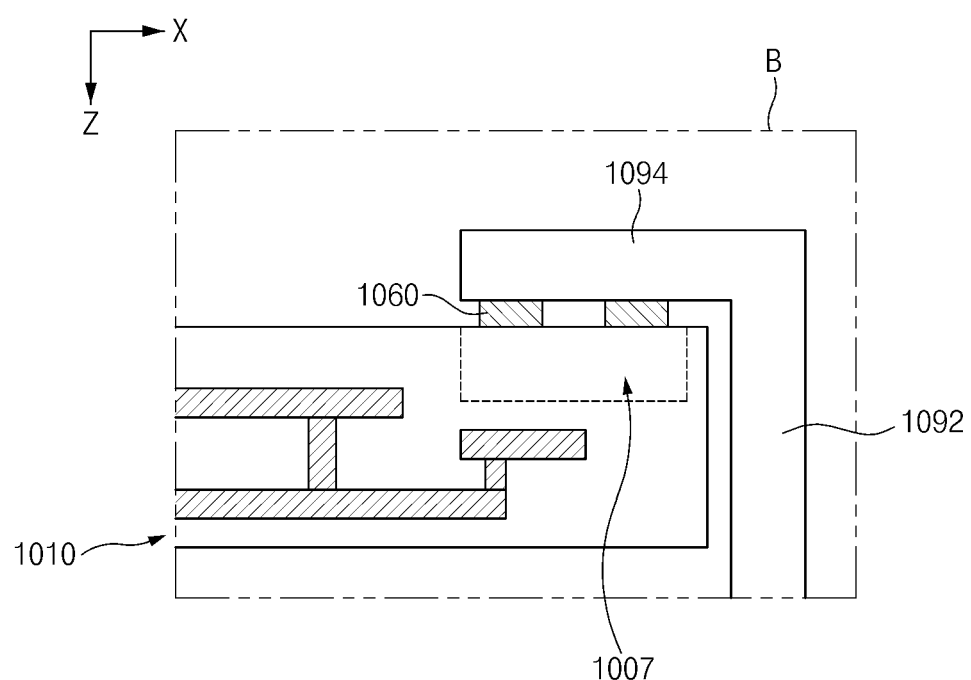
FIG. 10 is an enlarged cross-sectional view illustrating of area B in FIG. 9.
Figure 11A:
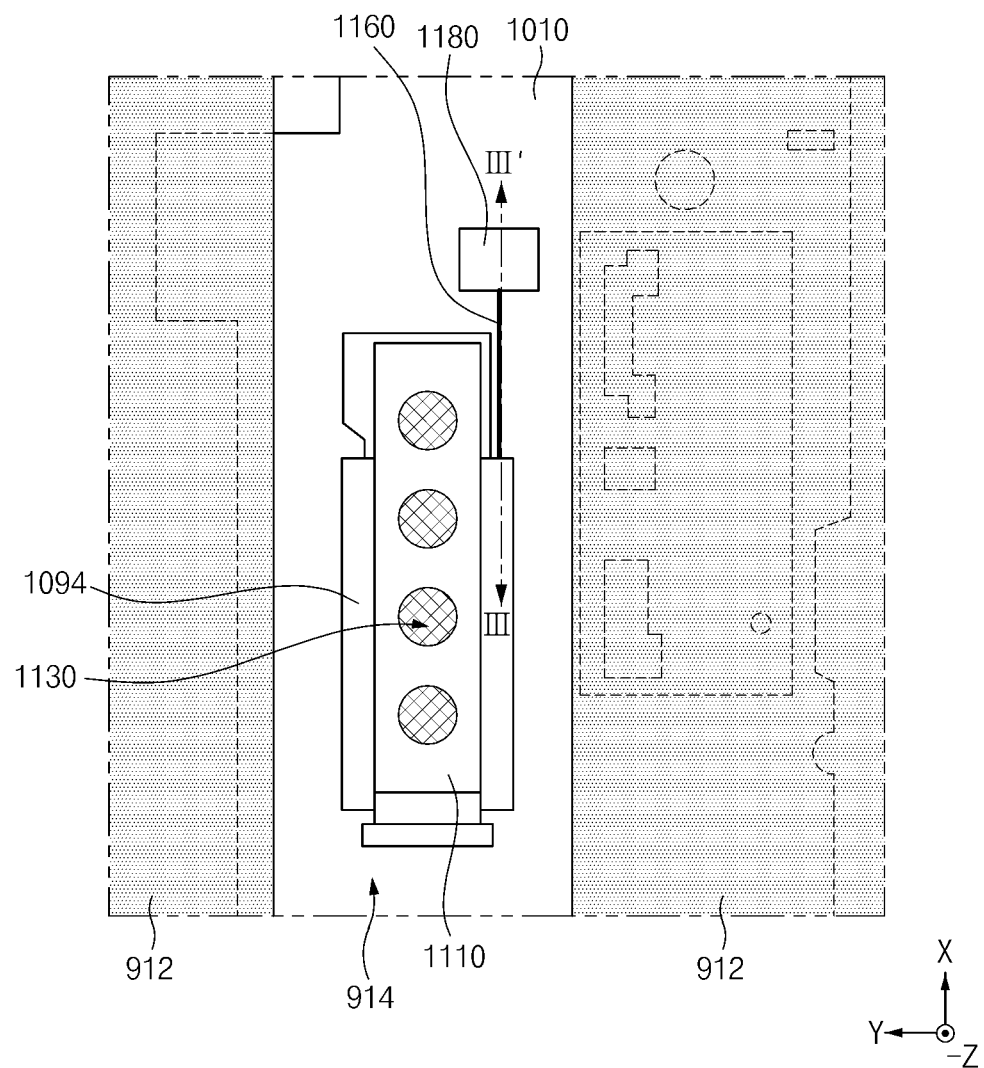
FIGS. 11A and 11B are views illustrating a connection relationship between a second frame and a sensing circuit unit according to certain embodiments.
Figure 11B:
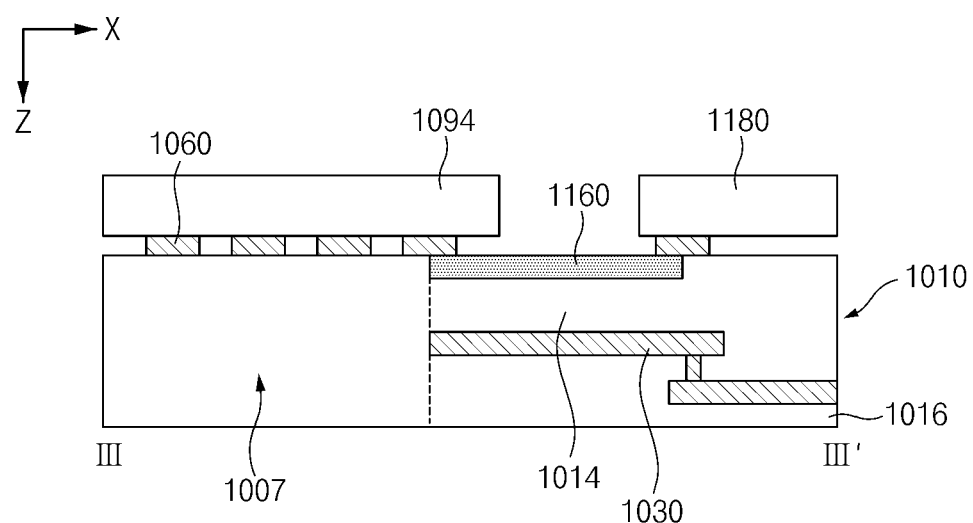

FIG. 9 is a cross-sectional view illustrating an electronic device according to certain embodiments. FIG. 10 is an enlarged cross-sectional view illustrating of area B in FIG. 9. FIG. 11A is a view illustrating a first antenna module and a grip sensing pad of an electronic device according to certain embodiments in detail. FIG. 11B is a view illustrating an electronic device, taken along line III-III'.

Referring to FIGS. 9 to 11B, an electronic device according to an embodiment may include a display 901, a first plate 911, a second plate 910, a first printed circuit board 1010, a first antenna module 1100, a support frame 1090 that functions as a grip sensing pad, a heat transfer member 904, and a heat dissipating member 902.

The heat transfer member 904 may be disposed between a first frame area 1096 of the support frame 1090, and the heat dissipating member 902. The heat transfer member 904 may transfer heat generated by an RFIC 1120 of the antenna module 1100 to the heat dissipating member. For example, the heat generated by the RFIC 1120 of the antenna module 1100 may be efficiently transferred to the heat dissipating member 902 through the first frame area 1096 and the heat transfer member 904. The heat transfer member 904 may include a thermal interface material (TIM). For example, the TIM may include a high thermally conductive material, such as graphite, a carbon nano tube, a natural regenerative material, or silicon.

The heat transfer member 904 may contact a front surface (e.g., a surface in the +Z direction) of the first frame area 1096 of the support frame 1090, and may contact a rear surface (e.g., a surface in the −Z direction) of the heat dissipating member 902. The heat transfer member 904 may be variously formed according to kinds and sizes of the first frame area 1096 and the heat dissipating member 902 that contact the heat transfer member 904, or a calorie generated by the RFIC 1120. For example, the heat transfer member 904 may have an extent that is larger than that of the first frame area 1096, and may have an extent that is equal to or smaller than the heat dissipating member 902.

The heat dissipating member 902 may reduce heat of high temperature, which may be concentrated around the antenna module 1100. The heat transferred through the heat transfer member 904 may be dispersed and emitted to the heat dissipating member 902 uniformly, and the heat generated by the antenna module 1100 may be dissipated effectively.

The heat dissipating member 902 may be formed of a sheet, a thin film, or a plate including aluminum (Al), copper (Cu), or a thermally conductive carbon-based material (e.g., carbon black, graphene, a carbon nano-tube, or graphite).

The first printed circuit board 1010 may include a cavity 1000. The support frame 1090, on which the antenna module 1100 is mounted, may be disposed in the cavity 1000 of the first printed circuit board 1010. The support frame 1090 that functions as a grip sensing pad may be disposed to be spaced apart from a second printed circuit board 1110, in which the antenna module 400 is disposed, by the cavity 1000.

The support frame 1090 may be disposed in a space between the first plate 911 and the second plate 910. For example, the support frame 1090 may be disposed between the second printed circuit board 1110 and the display 901.

The support frame 1090 may include the first frame area 1096, a second frame area 1094, and a side frame area 1092. At least any one of the first frame area 1096, the second frame area 1094, and the side frame area 1092 may be formed of a conductive material.

The first frame area 1096 may be disposed between the antenna module 1100 and the display 901. The antenna module 1100 may be disposed on the first frame area 1096. Because the first frame area 1096 is disposed to be spaced apart from the display 901 by the heat dissipating member 902 and the heat transfer member 904, the heat generated by the antenna module 1100 may be prevented from dispersing to the display 901. A first surface (e.g., a surface that faces the +Z axis direction) 1096a of the support frame 1090 may face the display 901, and the second printed circuit board 1110 may be disposed on a second surface (e.g., a surface that faces the −Z axis direction) 1096b facing an opposite direction to the first surface 1096a.

The second frame area 1094 may be formed of a conductive material to function as a grip sensing pad. The second frame area 1094 functioning as the grip sensing pad may overlap a fill-cut area 1007 with a solder pad 1060 is disposed therebetween. The solder pad 1060, as illustrated in FIG. 10, may be connected to the second frame area 1094. A portion of the solder pad 1060, as illustrated in FIG. 11, may be electrically connected to a grip sensing line 1160.

According to an embodiment, the second frame area 1094 may contact a rear surface (e.g., a surface that faces the −Z direction) of the first printed circuit board 1010 through the solder pad 1060. According to another embodiment, a portion of the second frame area 1094 may contact a rear surface (e.g., a surface that faces the −Z direction) of the first printed circuit board 1010 through the solder pad 1060, and a portion of the second frame area 1094 may contact the rear surface of the first printed circuit board 1010 through a nonconductive adhesive.

The side frame area 1092 may be bent towards the second frame area 1094 from the first frame area 1096. The second frame area 1094 may be disposed at a height of the same plane as that of the antenna module 1100, or may slightly protrude further than the antenna module 1100. The side frame area 1092 may be disposed to surround the first frame area 1096 between the first frame area 1096 and the second frame area 1094. Because the antenna module 1100 is held in the support frame 1090, the antenna module 1100 may be supported and fixed. According to an embodiment, the antenna module 1100 may include an antenna array 1130 including at least one patch antenna 1132, 1134, 1136, and 1138 (e.g., the antennas 432, 434, 436, and 438 of FIGS. 3 to 5), the second printed circuit board 1110 (e.g., the second printed circuit board 410 of FIGS. 3 to 5), and the RFIC 1120 (e.g., the RFIC 420 of FIGS. 3 to 50).

According to an embodiment, the first frame area 1096 may overlap the antenna module 1100. The first frame area 1096, the second frame area 1094, and the side frame area 1092 may overlap a second housing area 914 formed in a slot 920 of the second plate 910. The first frame area 1096, the second frame area 1094, and the side frame area 1092 may not overlap a first housing area 912 that is a conductive area of the second plate 910.

According to an embodiment, the second frame area 1094 that functions as a grip sensing pad may overlap a nonconductive area included in the second housing area 914. It may be determined whether the human body is proximate through a grip sensing signal generated in the second frame area 1094. For example, the second frame area 1094, when functioning as a grip sensing pad, may detect a sum (e.g., a self-capacitance) of a static capacitance value of the second frame area 1094 itself, and a load capacitance value by an external object (e.g., a finger of the user) that is contacting (e.g., gripping) the electronic device. Accordingly, the second frame area 1094 that functions as the grip sensing pad may generate a grip sensing signal including information related to a degree of grip of the user and a location of the grip. The grip sensing signal generated by the second frame area 1094 may be transmitted to a sensing circuit unit 1180 through the grip sensing line 1160. The sensing circuit unit 1180 may be embedded in a processor (e.g., the processor 120 of FIG. 1) disposed in the first printed circuit board 1010 or may be disposed in the first printed circuit board 1010 separately from the processor.

The sensing circuit unit 1180 may include a circuit that processes at least a portion of a signal received from the second frame area 1094 that functions as the grip sensing pad. For example, the sensing circuit unit 1180 may compare a value of a self-capacitance included in a grip sensing signal received from the second frame area 1094 with a threshold value.

The sensing circuit unit 1180 may control a maximum power intensity of a wireless signal, which is to be transmitted, by a communication circuit (e.g., the RFIC 720 of FIG. 6B) according to whether the value of the self-capacitance corresponds to a range of a threshold value. In an embodiment, an operation of decreasing a maximum power intensity of a wireless signal that may be used by the communication circuit may be referred to as a power-back-off.

According to an embodiment, the sensing circuit unit 1180 may control a communication module (e.g., the communication module 190 of FIG. 1) such that a power-back-off operation is performed when the self-capacitance value is larger than the threshold.

According to an embodiment, the sensing circuit unit 1180 may control a communication module (e.g., the communication module 190 of FIG. 1) such that maximum power intensity of a usable wireless signal when a power-back-off operation is not performed when the self-capacitance value is not more than the threshold value.

Figure 12:
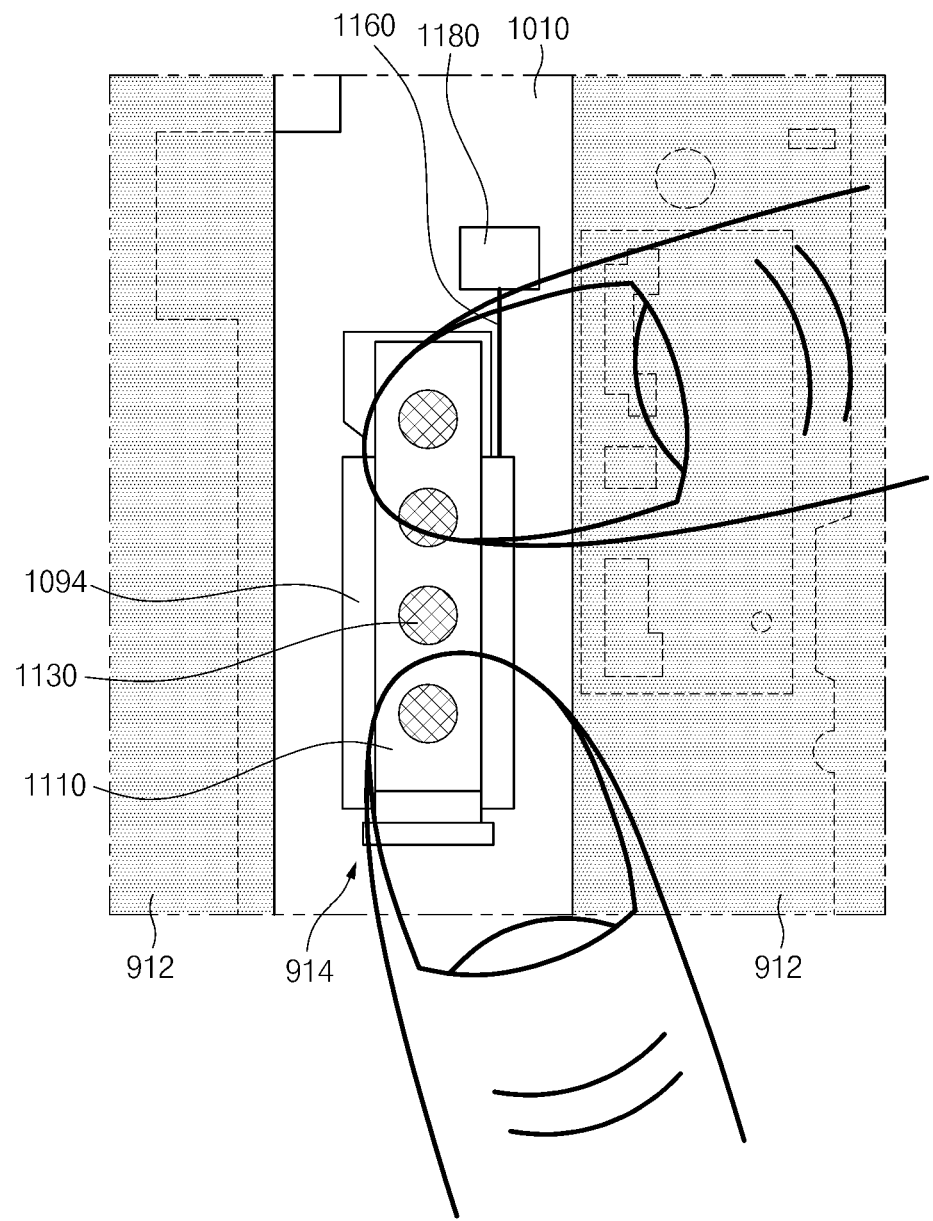
FIG. 12 is a view illustrating a grip sensing operation using a support frame that functions as a grip sensing pad according to certain embodiments.

FIG. 12 is a view illustrating a state in which a human body approaches an electronic device, according to an embodiment. The electronic device described in FIG. 12 may include elements that are similar to those of the electronic device described in FIGS. 9 to 11B.

Referring to FIG. 12, the second frame area 1094 that functions as the grip sensing pad of the electronic device may surround the antenna array 1130 at some preset minimum distance. The grip sensing operation using the second frame area 1094 may be performed in an area, towards which the antenna array 1130 radiates waves. Accordingly, when a human body part, such as a finger, approach the radiation area of the antenna array 1130, the user's body may be present in the grip sensing coverage.

For example, when the human body approaches a radiation area of the antenna array 1130, the second frame area 1094 may overlap an external object while the second housing area 914 that is a nonconductive area being interposed therebetween to form a self-capacitance. When the human body approaches the second housing area 914 that overlaps the second frame area 1094, self-capacitance may be increased. In this way, a change in the self-capacitance may be detected through the second frame area 1094 that functions as the grip sensing pad, and through this, it may be detected whether the human body is present in the radiation area of the antenna array 1130.

Figure 13:
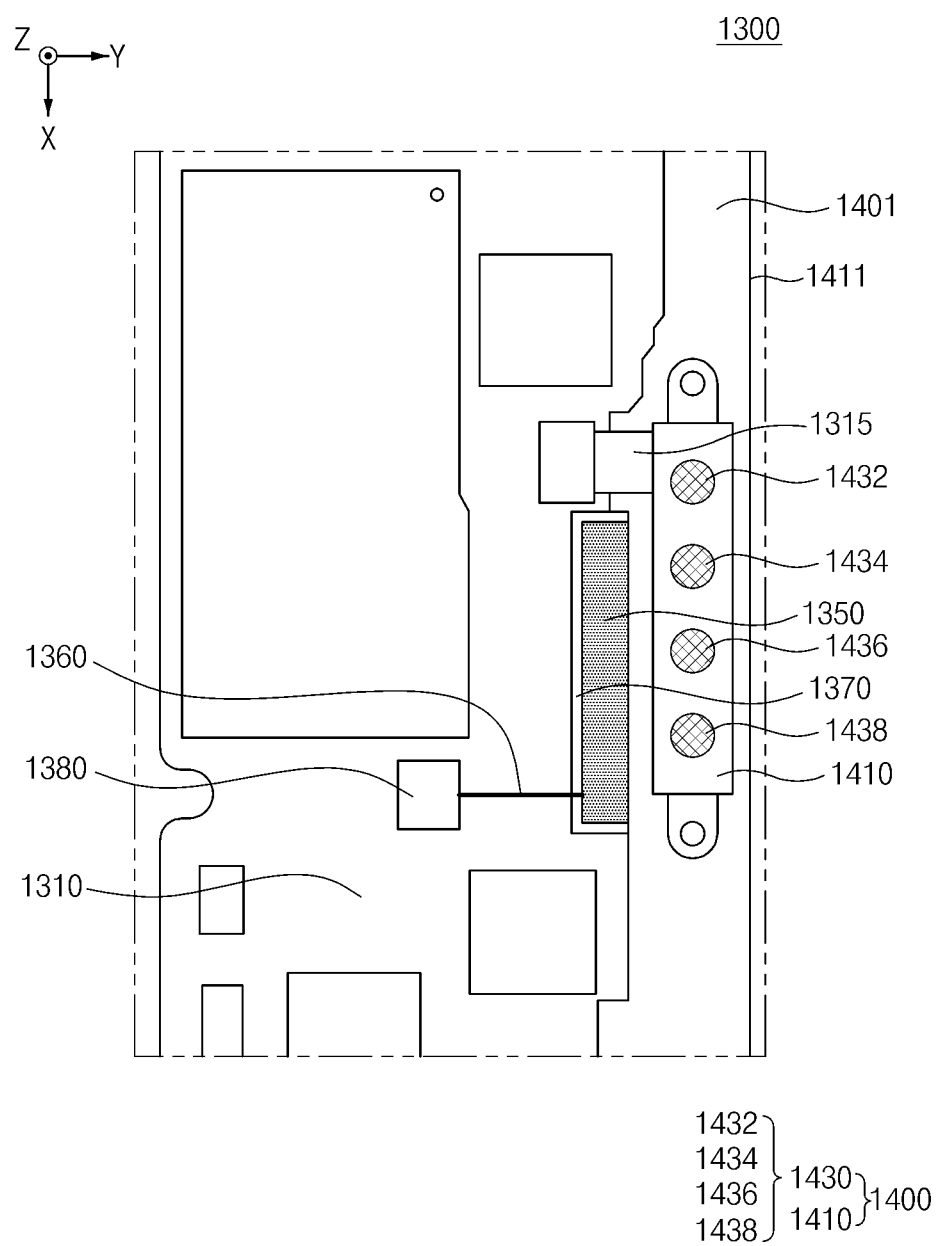
FIG. 13 is a cross-sectional view of an electronic device including a grip sensing pad according to certain embodiments.
Figure 14:
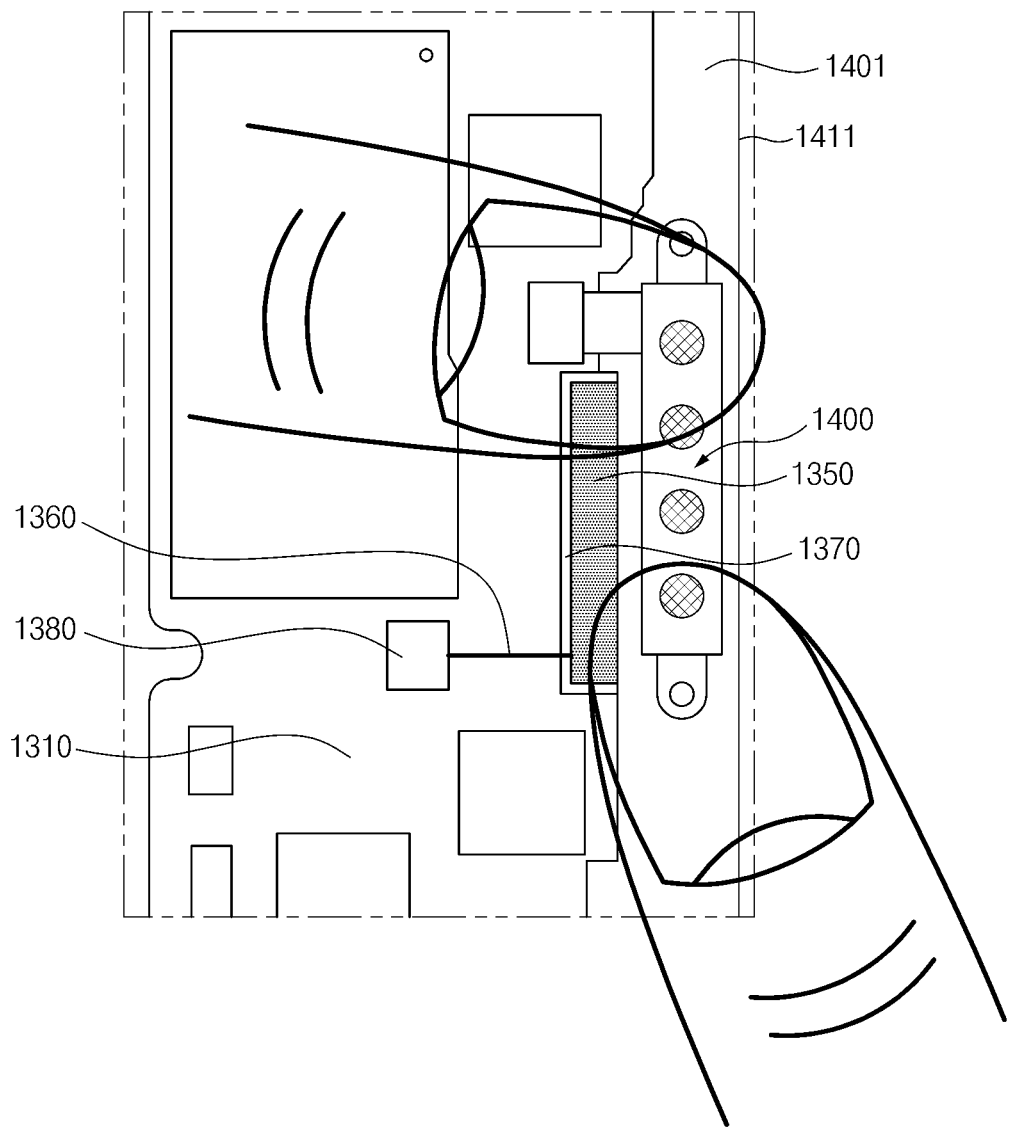
FIG. 14 is a view illustrating a grip sensing operation using the grip sensing pad illustrated in FIG. 13.

FIG. 13 is a plan view illustrating a disposition relationship between an antenna module and a grip sensing pad of an electronic device according to certain embodiments. FIG. 14 is a view illustrating a state, in which a human body approaches an electronic device illustrated in FIG. 13.

Referring to FIGS. 13 and 14, an electronic device 1300 according to certain embodiments may include a second antenna module 1400 (e.g., the second antenna module 251 of FIG. 2A) that radiates waves in a forward direction (e.g., the +Z direction), and a second grip sensing pad 1350 disposed to be close to the second antenna module 1400.

The second antenna module 1400 may be disposed in the support frame to be disposed in non-active areas, which are outside of where a screen is displayed, and may be disposed in a bezel area of a housing 1401 (e.g., the housing 210 of FIGS. 2A and 2B). For example, the second antenna module 1400 may be disposed in a side member (e.g., the side bezel structure 218 of FIG. 2 or a first plate 1411 (e.g., the front plate 202 of FIG. 2) of the housing). The second antenna module 1400 may include a fourth printed circuit board 1410, an antenna array 1430, a radio frequency integrated circuit (RFIC) (not illustrated). The fourth printed circuit board 1410 may be a portion of a third printed circuit board 1310 (e.g., the first printed circuit board 310 of FIG. 3) or may be formed separately from the third printed circuit board 1310 to be electrically connected to the third printed circuit board 1310 through a connection member 1315. The fourth printed circuit board 1410 may be electrically connected to the third printed circuit board 1310 through the connection member 1315. The antenna array 1430 may be disposed on the fourth printed circuit board 1410. According to another embodiment, a flexible printed circuit board (FPCB) may be used instead of the fourth printed circuit board 1410.

The antenna array 1430 may include a plurality of antennas 1432, 1434, 1436, and 1438 disposed to form an directional beam that radiates waves in a forward direction (e.g., the +Z direction). The plurality of antennas 1432, 1434, 1436, and 1438 may be formed in an interior of the fourth printed circuit board 1410, and may be formed on one surface of the fourth printed circuit board 1410. The antenna array 1430 may include a plurality of antennas of the same or different shapes or kinds. At least any one of the plurality of antennas included in the antenna array 1430 may include at least one of a patch antenna, a monopole antenna, a spiral antenna, a wave antenna, a loop antenna, a Vivaldi antenna, and a holographic antenna. For example, the plurality of antennas 1432, 1434, 1436, and 1438 included in the antenna array 1430 may be patch antennas.

The second grip sensing pad 1350 may be disposed at a site that does not affect a performance of the second antenna module 1400. The second grip sensing pad 1350 may be disposed to avoid overlapping a radiation direction of the second antenna array 1430 that radiates waves in a forward direction (e.g., a surface which the +Z direction faces) of the electronic device 1300. For example, the second grip sensing pad 1350 may be disposed to face at least one side of the second antenna module 1400. The second grip sensing pad 1350 may have an elliptical or polygonal shape such that a surface facing the second antenna module 1400 is widened. For example, the second grip sensing pad 1350 may have a rectangular shape, and the disclosure is not limited thereto.

The second grip sensing pad 1350 may be disposed in the third printed circuit board 1310 separate from the fourth printed circuit board 1410, in which the second antenna module 1400. Accordingly, the second grip sensing pad 1350 may be implemented without reducing an extent of the second grip sensing pad 1350 such that a specific capacitance is maintained even when the second antenna module 1400 is miniaturized.

The second grip sensing pad 1350 may be formed of a conductive material at a close proximity (e.g., a proximity less than a threshold distance) to the second antenna array 1430 increase the sensitivity of detection of proximity of an external object. The second grip sensing pad 1350 may be disposed on a fill-cut area 1370 of the third printed circuit board 1310. The second grip sensing pad 1350 may be formed of at least one conductive layer disposed on the third printed circuit board 1310 or at least one conductive layer included in the third printed circuit board 1310. For example, the second grip sensing pad 1350 may be formed of an uppermost one of the plurality of conductive layers included in the third printed circuit board 1310. The second grip sensing pad 1350 may be disposed to be spaced apart from the plurality of conductive layers included in the third printed circuit board 1310 while the fill-cut area 1370 of a slit form being interposed therebetween.

According to an embodiment, a solder resist layer for protecting the third printed circuit board 1310 may be removed from an area corresponding to the second grip sensing pad 1350. The solder resist layer may be disposed in the remaining area of the third printed circuit board 1310, except for the second grip sensing pad 1350.

The above-described second grip sensing pad 1350 may sense a sum (e.g., a self-capacitance) of a static capacitance value of the second grip sensing pad 1350 itself, and a load static capacitance value by an external object (e.g., a finger of a user) that grips the electronic device. According to an embodiment, when the external object approaches the radiation area of the second antenna module 1400, the second grip sensing pad 1350 may overlap the external object to form a self-capacitance. When the external object approaches the second grip sensing pad 1350, the self-capacitance may be increased.

Accordingly, the second grip sensing pad 1350 may generate a grip sensing signal including information related to a degree of grip of the user and a location of the grip. The grip sensing signal generated by the second grip sensing pad 1350 may be transmitted to a sensing circuit unit 1380 through a grip sensing line 1360. The sensing circuit unit 1380 may be embedded in a processor (e.g., the processor 120 of FIG. 3) mounted on the third printed circuit board 1310 or may be mounted on the third printed circuit board 1310 separately from the processor.

The sensing circuit unit 1380 may include a circuit that processes at least a portion of a signal received from the second grip sensing pad 1350. For example, the sensing circuit unit 1380 may compare a value of a self-capacitance included in a grip sensing signal received from the second grip sensing pad 1350 with a threshold value. The sensing circuit unit 1380 may transmit a control signal that restricts a maximum power of a wireless signal to a communication module (e.g., the communication module 190 of FIG. 1) when the self-capacitance value is larger than a threshold value. The sensing circuit unit 1380 may transmit a control signal that maintains a maximum power of a wireless signal to a communication module (e.g., the communication module 190 of FIG. 1) when the self-capacitance value is not more than a threshold value.

Figure 15:
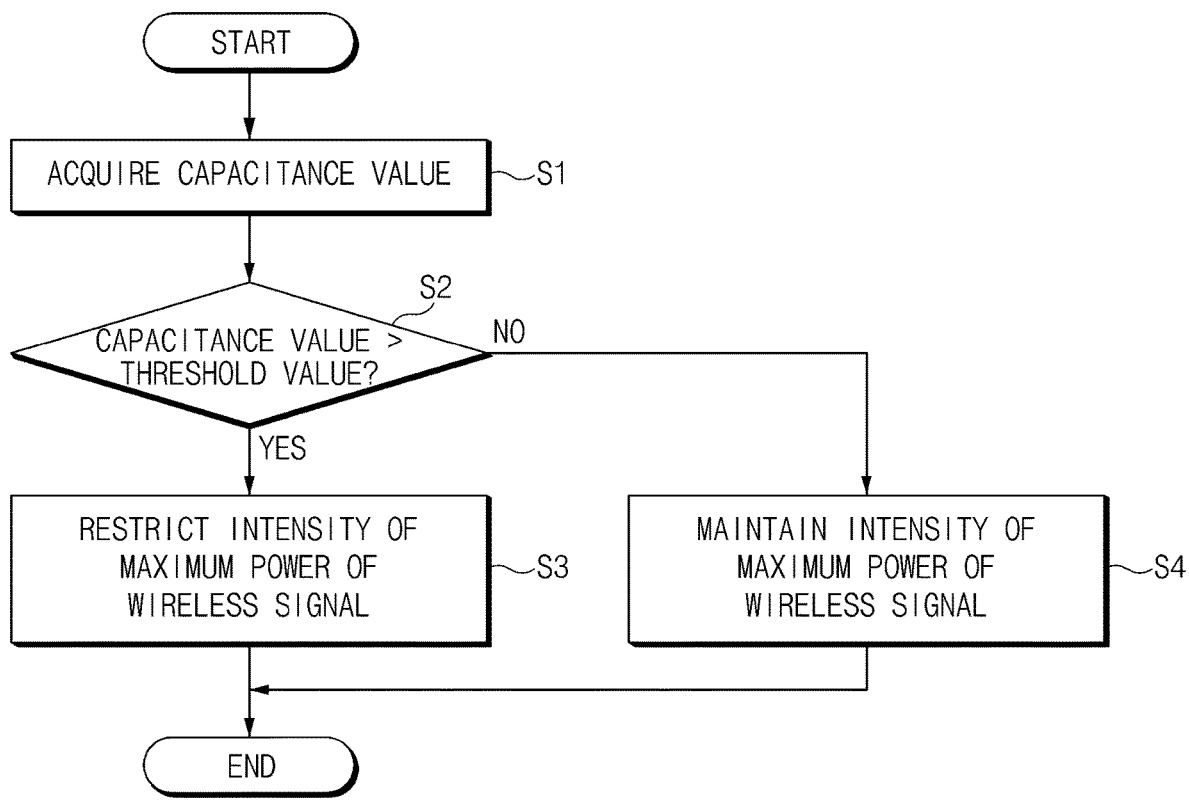
FIG. 15 is a flowchart illustrating a sensing operation using a grip sensor pad of an electronic device according to certain embodiments.
Figure 16A:
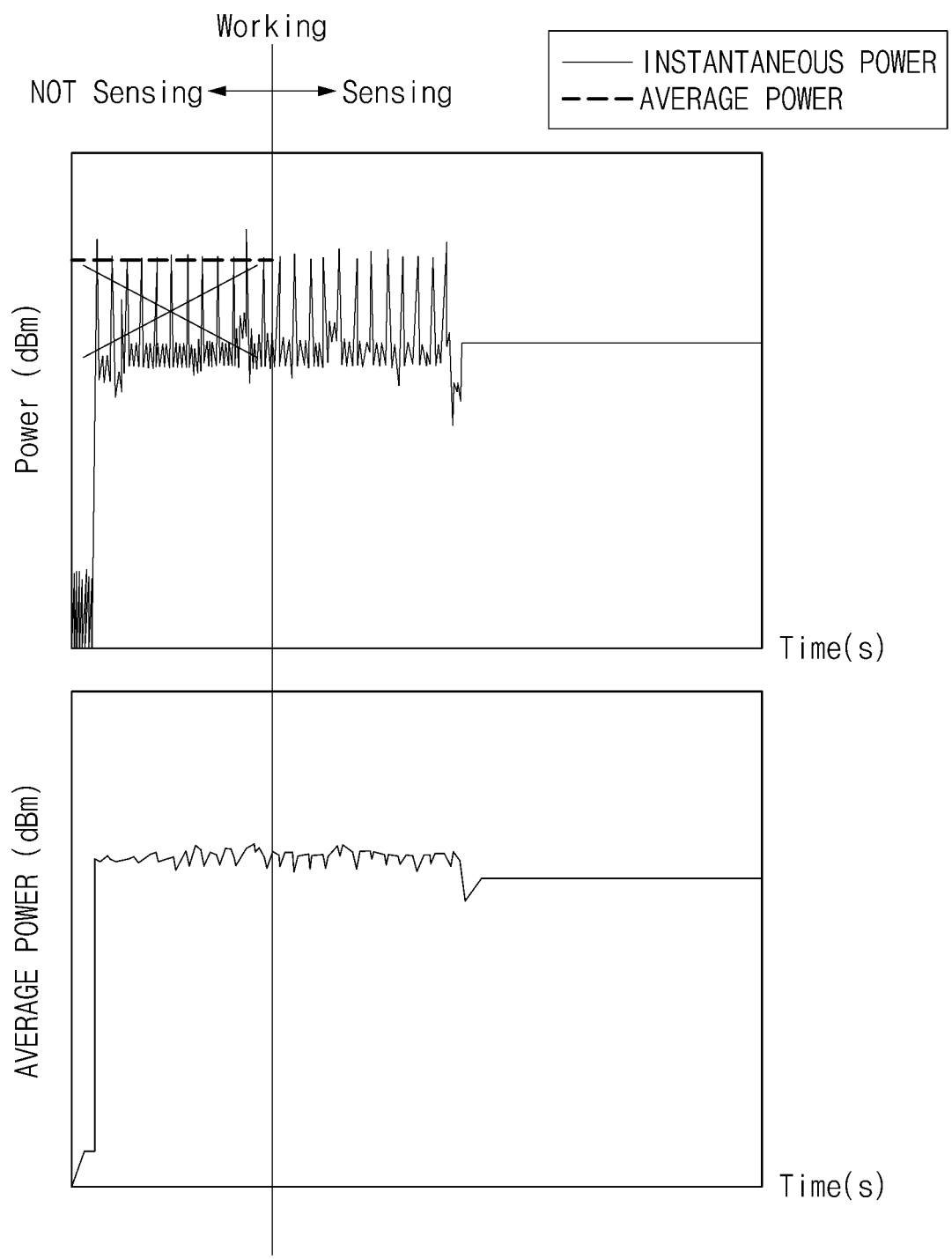
FIGS. 16A and 16B are views illustrating an output power of a wireless signal that is changed according to whether an electronic device and an external object approach each other.
Figure 16B:
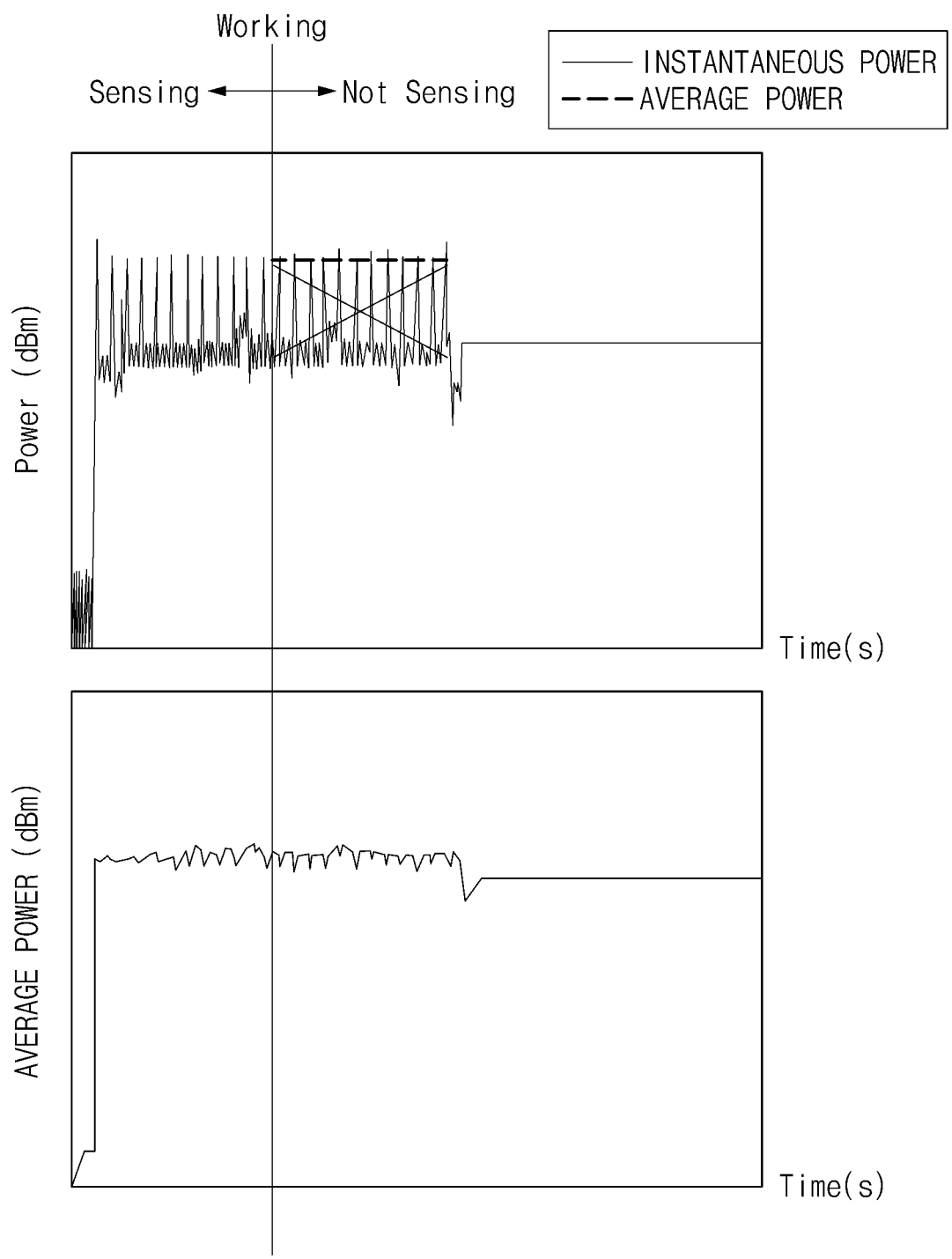

FIG. 15 is a flowchart illustrating a sensing operation using a grip sensor pad of an electronic device according to certain embodiments. FIGS. 16A and 16B are views illustrating an output power of a wireless signal that is changed according to whether a human body approaches an electronic device.

Referring to FIG. 15, in operation S1, the sensing circuit unit may acquire a sensing signal generated by the grip sensing pad, from the grip sensing pad. For example, when an external object, such as a portion of a human body, approaches the electronic device, the sensing circuit unit may detect a self-capacitance (e.g., or a change in the self-capacitance) using the grip sensing pad. The self-capacitance may increase when a human body part approaches the antenna module, as compared to the self-capacitance when a human body part does not approach the antenna module.

In operation S2, a processor (e.g., the processor 120 of FIG. 1) may identify whether a sensing signal corresponding to the self-capacitance (or the change in self-capacitance) corresponds to a preset signal range. In an embodiment, the preset signal range may be compared with the sensing signal, and may indicate a range of a detection signals indicating that the human body is within a specific distance range from the electronic device, or that the human body directly contacts the electronic device.

In operation S3, when the sensing signal is greater than a signal intensity of a preset range, the processor may determine that the human body approaches the antenna module, and a state in which a human body is proximate is detected. For example, when the self-capacitance value measured by the sensing circuit unit through the grip sensing pad is larger than a threshold value, the human body proximate state may be identified. When the human body proximate state is identified, the processor may reduce a maximum power intensity of a wireless signal, as illustrated in FIG. 16A. For example, when the human body proximate state is identified, the processor may perform a control to alternately output a maximum power and a minimum power of a wireless signal. Accordingly, this alternation between maximum and minimum power results in an average power output lower than the maximum power intensity, and the time-averaged electronic wave exposure degree may satisfy a preset range, such as one corresponding to a national health standard for electromagnetic radiation.

In operation S4, when the sensing signal corresponds to a signal intensity of a preset range, the processor may determine that the human body is not proximate or contacting the antenna module, and a human body proximate state may be identified as "released," indicating an absence thereof of proximity and contact. For example, when the self-capacitance value measured by the sensing circuit unit through the grip sensing pad is smaller than or equal to a threshold value, the human body proximate state may identified as released. When the human body proximate state is identified as released, the processor may maintain an intensity of a maximum power of a wireless signal as illustrated in FIG. 16B. For example, when a spacing distance between the antenna module that radiates waves in any one of a forward direction and a rearward direction of the electronic device and the grip sensing pad disposed close to the antenna module is more than about 10 mm to 15.0 mm, the processor may output an intensity of a maximum power of a wireless signal. Accordingly, the maximum power intensity of the wireless signal may be transmitted consistently when the human body is not proximate or contacting the electronic device, and further, data throughput that is lost due to intermittently output of the minimum power intensity may be compensated for.

According to certain embodiments, the embodiment including the grip sensing pad may secure an RF performance that is the same as that of a comparative example that does not include the grip sensing pad.

An electronic device according to certain embodiments disclosed in the disclosure may include devices of various forms. The electronic devices, for example, may include a portable communication device (e.g., a smart phone), a computer device, a portable multimedia device, a portable medical device, a camera, a wearable device, or a home appliance. An electronic device according to certain embodiments of the disclosure is not limited to the above-mentioned devices.

According to certain embodiments, an electronic device may include a housing, at least a portion of which includes a nonconductive area, a first printed circuit board including a cavity and a fill-cut area, which overlap the nonconductive area, an antenna module including at least one antenna array disposed in the cavity, a support frame coupled to one surface of the first printed circuit board to support the antenna module, a grip sensing pad disposed to surround the cavity and which overlaps the fill-cut area, and a sensing circuit unit electrically connected to the grip sensing pad, and that controls an output power of the antenna module through the grip sensing pad.

According to certain embodiments, the first printed circuit board may include a circuit area including a plurality of insulation layers and a plurality of conductive layers, and the grip sensing pad may be spaced apart from the circuit area while the fill-cut area being interposed therebetween.

According to certain embodiments, the first printed circuit board may further include a solder resist layer disposed on the remaining area thereof, except for the fill-cut area.

According to certain embodiments, the first printed circuit board may include a circuit area including a plurality of insulation layers and a plurality of conductive layers, and the grip sensing pad may be disposed on the same plane as that of an uppermost one of the plurality of conductive layers and may be formed of the same material as that of the uppermost one of the plurality of conductive layers.

According to certain embodiments, the support frame may include a first frame area, in which a second printed circuit board spaced apart from the first printed circuit board and the antenna module including an antenna array disposed on the second printed circuit board, a second frame area facing the first printed circuit board, and a side frame area bent toward the first printed circuit board in the first frame area.

According to certain embodiments, at least one of the plurality of conductive layers of the first printed circuit board may be electrically connected to a ground, and the at least one of the conductive layers of the first printed circuit board, which is electrically connected to the ground, may be electrically connected to the second frame area of the support frame.

According to certain embodiments, the at least one of the conductive layers of the first printed circuit board, which is electrically connected to the ground, may be spaced apart from the grip sensing pad.

According to certain embodiments, the grip sensing pad may overlap the first frame area.

According to certain embodiments, the electronic device may further include a display spaced apart from the first frame area of the support frame while an air gap being interposed therebetween.

According to certain embodiments, the nonconductive area of the housing may overlap the grip sensing pad and the antenna module, a conductive area of the housing may overlap the second frame area, and the antenna module may radiate waves toward the housing.

According to certain embodiments, the grip sensing pad may have a frame shape, of which an area corresponding to the antenna module is empty.

According to certain embodiments, the support frame may include a first frame area, in which a second printed circuit board spaced apart from the first printed circuit board and the antenna module including an antenna array disposed on the second printed circuit board, a second frame area facing the first printed circuit board and operated as the grip sensing pad, and a side frame area bent toward the first printed circuit board in the first frame area.

According to certain embodiments, the second frame area may be coupled to the fill-cut area through an adhesive or a solder pad.

According to certain embodiments, the second frame area may be electrically connected to the sensing circuit unit disposed on the first printed circuit board.

According to certain embodiments, the electronic device may further include a heat dissipating member disposed between the first frame area and a display, and a heat transfer member contacting the first frame area and the heat dissipating member, between the first frame area and the heat dissipating member.

According to certain embodiments, the nonconductive area of the housing may overlap the second frame area and the antenna module.

According to certain embodiments, the electronic device may further include a second antenna module that radiate waves in an opposite direction to a first antenna module, and a second grip sensing pad disposed close to the second antenna module.

According to certain embodiments, the electronic device may further include a third printed circuit board, in which the second grip sensing pad is disposed, and including a second fill-cut area, and a fourth printed circuit board, in which the second antenna module is disposed.

According to certain embodiments, the third printed circuit board may include a circuit area including a plurality of insulation layers and a plurality of conductive layers, and the grip sensing pad may be disposed on the same plane as that of an uppermost one of the plurality of conductive layers and may be formed of the same material as that of the uppermost one of the plurality of conductive layers.

According to certain embodiments, the third printed circuit board may include a circuit area including a plurality of insulation layers and a plurality of conductive layers, and the grip sensing pad may be spaced apart from the circuit area while the fill-cut area being interposed therebetween.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
a housing including a nonconductive area;
a first printed circuit board (PCB) including a cavity and a fill-cut area, overlapping the nonconductive area;
a first antenna module including at least one antenna array disposed in the cavity of the first PCB;
a support frame coupled to one surface of the first PCB, supporting the first antenna module;
a grip sensing pad surrounding the cavity and overlapping the fill-cut area; and
a sensing circuit unit electrically connected to the grip sensing pad, configured to control an output power of the first antenna module based on inputs received via the grip sensing pad.

2. The electronic device of claim 1, wherein the first PCB includes a circuit area including a plurality of insulation layers, and a plurality of conductive layers, and
wherein the grip sensing pad is spaced apart from the circuit area, and the fill-cut area is interposed therebetween.

3. The electronic device of claim 1, wherein the first PCB further includes a solder resist layer disposed outside of the fill-cut area.

4. The electronic device of claim 1, wherein the first PCB includes a circuit area including a plurality of insulation layers, and a plurality of conductive layers, and
wherein the grip sensing pad is disposed on a same plane as an uppermost layer of the plurality of conductive layers, and is formed of a same material as the uppermost layer.

5. The electronic device of claim 2, wherein the support frame includes:
a first frame area, in which a second PCB is disposed spaced apart from the first PCB, wherein the first antenna module disposed on the second PCB;
a second frame area facing the first PCB; and
a side frame area bent towards the first PCB in the first frame area.

6. The electronic device of claim 5, wherein at least one of the plurality of conductive layers of the first PCB is electrically connected to a ground and to the second frame area of the support frame.

7. The electronic device of claim 6, wherein the at least one of the conductive layers of the first PCB is spaced apart from the grip sensing pad.

8. The electronic device of claim 5, wherein the grip sensing pad overlaps the first frame area.

9. The electronic device of claim 5, further comprising:
a display spaced apart from the first frame area of the support frame, with an air gap being interposed therebetween.

10. The electronic device of claim 5, wherein the housing further includes a conductive area in addition to the nonconductive area,
wherein the nonconductive area of the housing overlaps the grip sensing pad and the first antenna module,
wherein the conductive area of the housing overlaps the second frame area, and
wherein the first antenna module is configured to radiate electromagnetic waves towards the housing.

11. The electronic device of claim 1, wherein the grip sensing pad is formed in a shape corresponding to the support frame, for which an area corresponding to the first antenna module is empty.

12. The electronic device of claim 1, wherein the support frame includes:
a first frame area, in which a second PCB is disposed spaced apart from the first PCB,
wherein the first antenna module is disposed on the second PCB;
wherein a second frame area is disposed facing the first PCB, and is operable as the grip sensing pad; and
wherein a side frame area is bent toward the first PCB in the first frame area.

13. The electronic device of claim 12, wherein the second frame area is coupled to the fill-cut area using an adhesive or a solder pad.

14. The electronic device of claim 12, wherein the second frame area is electrically connected to the sensing circuit unit disposed on the first PCB.

15. The electronic device of claim 12, further comprising:
a heat dissipating member disposed between the first frame area and a display; and
a heat transfer member disposed between the first frame area and the heat dissipating member, and contacting both the first frame area and the heat dissipating member.

16. The electronic device of claim 12, wherein the nonconductive area of the housing overlaps the second frame area and the first antenna module.

17. The electronic device of claim 1, further comprising:
a second antenna module configured to radiate electromagnetic waves in an opposite direction relative to the first antenna module; and
a second grip sensing pad disposed proximate to the second antenna module.

18. The electronic device of claim 17, further comprising:
a third PCB, in which the second grip sensing pad is disposed, and including a second fill-cut area; and
a fourth PCB, in which the second antenna module is disposed.

19. The electronic device of claim 18, wherein the third PCB includes a circuit area including a plurality of insulation layers and a plurality of conductive layers, and
wherein the grip sensing pad is disposed on a same plane as that of an uppermost layer of the plurality of conductive layers, and is formed of a same material as the uppermost layer.

20. The electronic device of claim 18, wherein the third PCB includes a circuit area including a plurality of insulation layers and a plurality of conductive layers, and wherein the grip sensing pad is spaced apart from the circuit area, and the fill-cut area is interposed therebetween.

\* \* \* \* \*